US010776173B1

(12) United States Patent
Greenwood et al.

(10) Patent No.: US 10,776,173 B1
(45) Date of Patent: Sep. 15, 2020

(54) LOCAL PLACEMENT OF RESOURCE INSTANCES IN A DISTRIBUTED SYSTEM

(71) Applicant: Amazon Technologies, Inc., Seattle, WA (US)

(72) Inventors: Christopher Magee Greenwood, Seattle, WA (US); James Pinkerton, Sammamish, WA (US); Danny Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 15/967,443

(22) Filed: Apr. 30, 2018

(51) Int. Cl.
  G06F 9/50 (2006.01)
  H04L 29/08 (2006.01)
  G06F 9/54 (2006.01)

(52) U.S. Cl.
  CPC .......... *G06F 9/5077* (2013.01); *G06F 9/5016* (2013.01); *G06F 9/547* (2013.01); *H04L 67/10* (2013.01)

(58) Field of Classification Search
  CPC ......... H04L 67/10; G06F 9/547; G06F 9/5077
  USPC ....................................................... 709/226
  See application file for complete search history.

(56) References Cited

U.S. PATENT DOCUMENTS

| 5,574,878 | A | 11/1996 | Onodera et al. |
| 6,463,509 | B1 | 10/2002 | Teoman et al. |
| 7,502,859 | B2 | 3/2009 | Inoue et al. |
| 7,895,261 | B2 | 2/2011 | Jones et al. |
| 8,280,853 | B1 | 10/2012 | Lai et al. |
| 8,280,952 | B1 | 10/2012 | Parsons et al. |
| 8,285,687 | B2 | 10/2012 | Voll et al. |
| 8,452,819 | B1 | 5/2013 | Sorenson, III et al. |
| 9,032,077 | B1 | 5/2015 | Klein et al. |
| 9,110,600 | B1 | 8/2015 | Brooker et al. |
| 9,246,996 | B1 | 1/2016 | Brooker et al. |
| 9,503,517 | B1 | 11/2016 | Brooker et al. |
| 9,804,993 | B1 | 10/2017 | Brooker et al. |

(Continued)

FOREIGN PATENT DOCUMENTS

WO 2011/088261 7/2011

OTHER PUBLICATIONS

U.S. Appl. No. 13/466,007, filed May 7, 2012, Marc J. Brooker, et al.

(Continued)

*Primary Examiner* — Minh Chau Nguyen
(74) *Attorney, Agent, or Firm* — Robert C. Kowert; Kowert, Hood, Munyon, Rankin & Goetzel, P.C.

(57) ABSTRACT

A distributed system may include one or more interfaces, such as APIs, allowing a client to request a resource instance and further provide information about the resource instance that can be used to determine a placement domain for resource instance. For example, a compute instance may be placed in a same placement domain as a volume that provides block storage for the compute instance. In some embodiments, a resource placement manager may "jam" place a resource instance in a particular placement domain, wherein the "jam" placement causes one or more placement constraints to be temporarily violated. The resource placement manager may then perform one or more mitigating actions to return the particular placement domain to a state that satisfies the one or more placement constraints.

20 Claims, 17 Drawing Sheets

(56) References Cited

U.S. PATENT DOCUMENTS

| | | | |
|---|---|---|---|
| 10,057,187 B1* | 8/2018 | Dhoolam | G06F 3/0605 |
| 10,154,091 B1* | 12/2018 | Flaherty | H04L 41/0806 |
| 10,616,134 B1* | 4/2020 | Greenwood | H04L 47/783 |
| 2002/0059253 A1 | 5/2002 | Albazz et al. | |
| 2003/0058855 A1 | 3/2003 | Feyerabend et al. | |
| 2003/0191930 A1 | 10/2003 | Viljoen et al. | |
| 2004/0030457 A1 | 2/2004 | Bayoumi et al. | |
| 2004/0078419 A1 | 4/2004 | Ferrari et al. | |
| 2004/0260873 A1 | 12/2004 | Watanabe | |
| 2006/0095711 A1 | 5/2006 | Aridor et al. | |
| 2006/0155950 A1 | 7/2006 | Smith | |
| 2008/0005468 A1 | 1/2008 | Faibish et al. | |
| 2008/0140905 A1 | 6/2008 | Okuyama | |
| 2008/0184250 A1 | 7/2008 | Hamadi et al. | |
| 2009/0132617 A1 | 5/2009 | Soran et al. | |
| 2009/0228889 A1 | 9/2009 | Yoshida | |
| 2009/0235104 A1 | 9/2009 | Fung | |
| 2009/0249470 A1 | 10/2009 | Litvin et al. | |
| 2009/0263026 A1 | 10/2009 | Verne et al. | |
| 2009/0327346 A1 | 12/2009 | Teinila et al. | |
| 2010/0037009 A1 | 2/2010 | Yano et al. | |
| 2010/0070725 A1 | 3/2010 | Prahland et al. | |
| 2010/0077158 A1 | 3/2010 | Asano et al. | |
| 2010/0115049 A1 | 5/2010 | Matsunaga et al. | |
| 2010/0125665 A1 | 5/2010 | Simpson et al. | |
| 2010/0191922 A1 | 7/2010 | Dickey et al. | |
| 2010/0312983 A1 | 12/2010 | Moon et al. | |
| 2011/0010634 A1 | 1/2011 | Hatasaki et al. | |
| 2011/0252135 A1 | 1/2011 | Kudo | |
| 2011/0060885 A1 | 3/2011 | Satoyama et al. | |
| 2011/0246526 A1 | 10/2011 | Finkelstein et al. | |
| 2011/0320754 A1 | 12/2011 | Ichikawa et al. | |
| 2012/0030404 A1 | 2/2012 | Yamamoto et al. | |
| 2012/0060006 A1 | 3/2012 | Paterson-Jones et al. | |
| 2012/0079221 A1 | 3/2012 | Sivasubramanian et al. | |
| 2012/0096165 A1 | 4/2012 | Madduri et al. | |
| 2012/0254687 A1 | 10/2012 | Leggette et al. | |
| 2012/0265569 A1 | 10/2012 | Gonzalez-Diaz et al. | |
| 2012/0284712 A1 | 11/2012 | Nimmagadda et al. | |
| 2013/0046966 A1 | 2/2013 | Chu et al. | |
| 2013/0151683 A1 | 6/2013 | Jain et al. | |
| 2013/0185414 A1 | 7/2013 | Puttaswamy Naga | |
| 2013/0185436 A1 | 7/2013 | Carlin et al. | |
| 2013/0219068 A1 | 8/2013 | Ballani et al. | |
| 2014/0059379 A1 | 2/2014 | Ren et al. | |
| 2014/0259012 A1 | 9/2014 | Nandlall et al. | |
| 2014/0380303 A1 | 12/2014 | Bello et al. | |
| 2015/0039767 A1 | 2/2015 | Matczynski et al. | |
| 2015/0066929 A1 | 3/2015 | Satzke et al. | |
| 2015/0092557 A1 | 4/2015 | Deshmukh | |
| 2015/0113144 A1 | 4/2015 | Bauer et al. | |
| 2015/0120931 A1 | 4/2015 | Padala et al. | |
| 2015/0163157 A1 | 6/2015 | Hao et al. | |
| 2015/0236977 A1 | 8/2015 | Terayama et al. | |
| 2015/0248305 A1 | 9/2015 | Shu et al. | |
| 2015/0261578 A1 | 9/2015 | Greden et al. | |
| 2015/0295849 A1 | 10/2015 | Xia et al. | |
| 2015/0355892 A1 | 12/2015 | Glikson et al. | |
| 2016/0050129 A1 | 2/2016 | Hoyne | |
| 2016/0103698 A1 | 4/2016 | Yang et al. | |
| 2016/0142338 A1 | 5/2016 | Steinder et al. | |
| 2016/0301598 A1 | 10/2016 | Strijkers et al. | |
| 2017/0132746 A1* | 5/2017 | Wilt | G06F 9/45558 |
| 2019/0114080 A1* | 4/2019 | Pydipaty | G06F 3/067 |

OTHER PUBLICATIONS

VMware; Carl Waldspurger; Memory Resource Management in WMware ESX Servier, Dec. 10, 2002, pp. 1-24.

HP; Chris Hyser et al., Autonomic Virtual Machine Placement in the Data Center; Feb. 26, 2008; pp. 1-10.

"Amazon EBS API and Command Overview", downloaded Jul. 11, 2013 from doc.aws.amazon.com/AWSEC2/latest/UserGuide/ebs-api-cli-overview.html, p. 1.

"AMI Basics", downloaded Jul. 11, 2013 from doc.aws.amazon.com/AWSEC2/latest/UserGuide/ComponentsAMIs.html, pp. 1-2.

"AWS Amazon Elastic Block Store (EBS)—Present Storage", downloaded Jul. 11, 2013, from aws.amazon.com/ebs/, pp. 1-4.

"Cloudiquity", Published Mar. 12, 2009, Amazon Web Services and Cloud, pp. 1-4.

"Feature Guide: Elastic Block Store: Articles & Tutorials: Amazon Web Services", downloaded Jul. 11, 2013 from aws.amazon.com/articles/1667, pp. 1-7.

U.S. Appl. No. 14/625,535, filed Feb. 18, 2015, Surya Prakash Dhoolam, et al.

U.S. Appl. No. 14/643,479, filed Mar. 10, 2015, Christopher Magee Greenwood, et al.

Merriam-Webster, "evaluate", 2018.

Meriam-Webster, "associate", 2018.

Techopedia, "Virtual Machine", 2017, pp. 1.

Rochman, et al., "Resource Placement and Assignment in Distributed Network Topologies", 2013, pp. 1-13.

\* cited by examiner

US 10,776,173 B1

LOCAL PLACEMENT OF RESOURCE INSTANCES IN A DISTRIBUTED SYSTEM

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware.

Virtualized computing environments are frequently supported by block-based storage, object-based storage, database services, and/or other virtual storage services. In some situations, storage resources may be able to interact with various computing virtualizations through a series of standardized storage calls that render the storage resources functionally agnostic to the structural and functional details of the volumes that they support and the operating systems executing on the virtualizations to which they provide storage availability. In order to provide block-based storage, object-based storage, database services, and/or other virtual services various different infrastructure configurations and/or constraints may be implemented in order to provide performance guarantees. When creating or modifying storage resources or compute resources, placement of the storage resources or compute resources relative to one another may impact performance of the storage or compute resources.

Figure 1A:
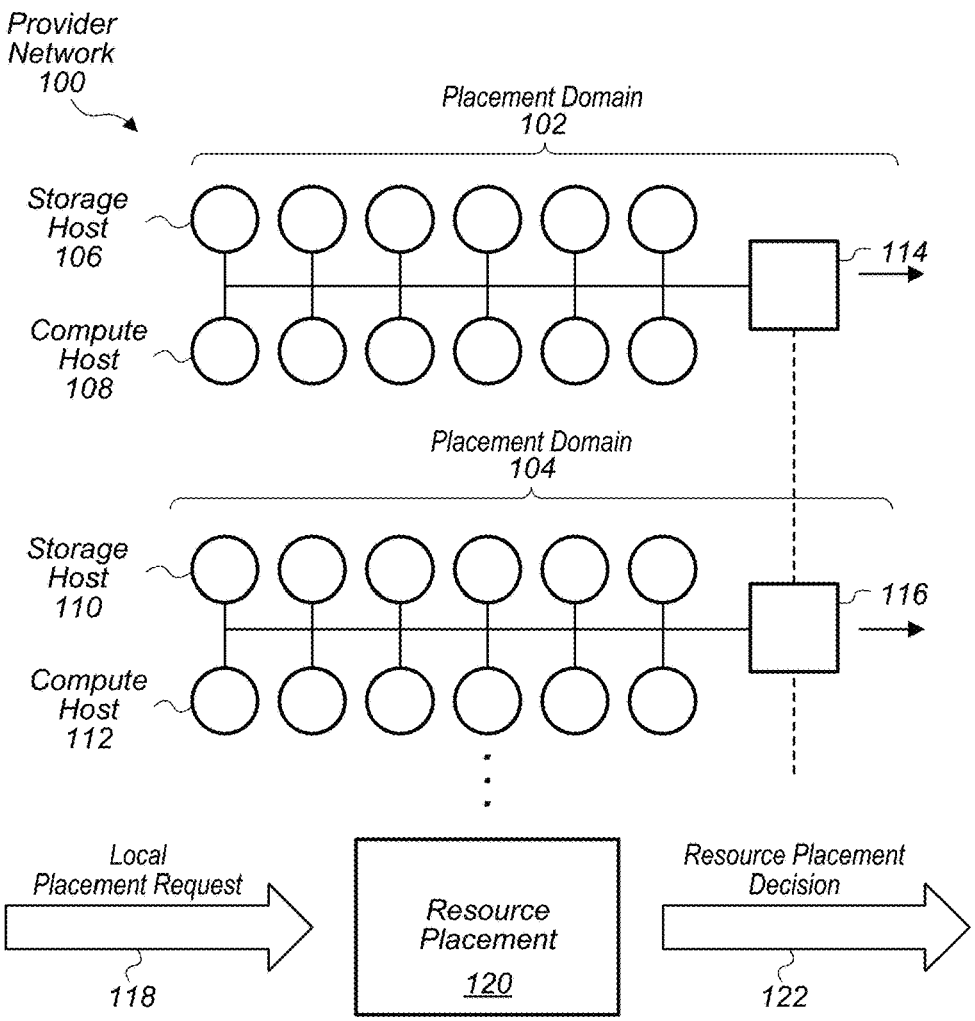
FIG. 1A illustrates a block diagram of a provider network comprising multiple placement domains and a resource placement manager, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement local placement for resource instances in a particular placement domain of a distributed system of a provider network. Distributed systems may host various resource instances for performing or implementing different systems, services, applications and/or functions. Resource instances may be one of many different types of resource instances hosted at a resource host of a distributed system, such as one of various types of physical or virtualized computing resources, storage resources, or networking resources. For example, a resource instance can be a storage volume containing data and a storage service may host different volume replicas of data across a number of different resource hosts.

In some embodiments, a placement domain may comprise a portion of a provider network, wherein compute hosts and storage hosts included in the placement domain are local to one another. In some embodiments, a placement domain may be based on network topography. For example, in some embodiments, a particular placement domain may be a particular network spine comprising a router or mesh of routers that connect a set of compute hosts and a set of storage hosts to other network spines of a provider network and/or other networks. In some embodiments, a placement domain may be a data center of a provider network or an availability zone of a provider network. In some embodiments, a placement domain may be based on one or more performance characteristics. For example, in some embodiments, a placement domain may include compute hosts and storage hosts capable of communicating with each other with a latency below a threshold amount. As another example, in some embodiments, a placement domain may include storage hosts capable of performing at least a threshold number of input/output transactions per unit of time (IOPS). In some embodiments, a placement domain may include compute hosts having at least a threshold processing capacity. In some embodiments, a placement domain may be defined as compute hosts and storage hosts in a local region of a data center such as a common aisle or even rack.

In some embodiments, in order to provide performance, availability, and durability characteristics for resource instances implemented in a distributed system, infrastructure diversity constraints, durability constraints, physical capacity constraints, reserved capacity constraints, TOPS constraints, etc. may be enforced for placement of resource instances.

In some embodiments, infrastructure diversity constraints may help to avoid common failure and other performance scenarios which may reduce the availability and/or durability of resource instances. For instance, infrastructure diversity constraints may protect, enhance, optimize or support associated resource instances, such as different replicas of a resource instance, resource instances working together, resource instances dependent on other resource instances, or any other resource instance relationship. In one such example, a storage service may implement an infrastructure diversity constraint to host different replicas of data at different hosts on different server racks (as resource hosts (e.g., servers) on the same server rack may typically experience common failures).

In some embodiments, durability constraints may require each resource instance to be replicated, such that the distributed system can tolerate one or more failures without losing data for the resource instance. In some embodiments, a durability constraint and a diversity constrained may be combined, for example to require that a replica for a resource instance be stored in a resource host in a different server rack than a server rack comprising a resource host implementing the resource instance. In some embodiments, a distributed system may automatically create and maintain replicas for resource instances implemented on resource hosts of the distributed system.

In some embodiments, physical capacity constraints may be based on physical hardware limitations of resource hosts implementing one or more resource instances. For example, a storage physical capacity constraint may be based on a physical storage capacity of one or more resource hosts, such as a capacity of hard drives, solid-state drives, tape-drives, etc. to store data. In some embodiments, a physical capacity constraint may be set below an ultimate capacity of underlying resource hosts. For example, a physical storage capacity constraint may be set such that storage hosts for a particular placement domain are constrained to store no more data than a particular percentage (e.g. 90%) of the total data storage capacity of the storage hosts of the particular placement domain. Note that storage is given as an example, however physical capacity constraints may be applied for other aspects of resource hosts, such as compute capacity, TOPS, bandwidth, etc.

In some embodiments, reserved capacity constraints may be based on expected client utilization of resources for a placement domain. For example, a client may be allocated a resource instance guaranteed to be able to store 1 terabyte of data, but may only store 500 megabytes of data to the resource instance. In some embodiments, a provider network may set a reserved capacity constraint for a particular placement domain to be greater than collective physical storage capacities of resource hosts of the particular placement domain, such as hard drives, solid-state drives, tape-drives, etc. For example, a reserved storage capacity constraint may be set to be no more data than a particular percentage (e.g. 120%) of the total data storage capacity of the storage hosts of a particular placement domain. As an example, once storage space guaranteed to customers (but not necessarily utilized) for a particular placement domain exceeds the particular percentage (e.g. 120%) of the storage capacity of the resource hosts of the placement domain, the provider network may enforce a placement constraint that prevents additional storage space to be allocated for the particular placement domain. However, since the probability that all clients of the particular placement domain utilize their maximum guaranteed storage capacity at the same time, the system may be able to meet all performance guarantees for the resource instances allocated to the clients despite a reserved capacity that exceeds the total data storage capacity of the storage hosts of a particular placement domain.

In some embodiments, IOPS constraints may be based on a capacity of resource hosts to perform a number of input/output operations per unit of time. For example, a client may request a guaranteed number of IOPS for resource instances allocated to the client and implemented on resource hosts of a provider network. Additionally, the physical hardware implementing the resource hosts (and resource instances) may have a fixed capacity to perform IOPS. Thus, IOPS constraints may ensure that IOPS guarantees made to clients do not exceed the distributed system's capability to perform IOPS. In some embodiments, IOPS constraints may be "physical capacity constraints" or "reserved capacity constraints." For example, in some embodiments a provider network may allocate resource instances to clients with guaranteed IOPS performance, wherein the collective total of guaranteed TOPS performance of the allocated resource instances exceed the total capacity of the underlying physical hardware to perform the guaranteed TOPS. However, in nearly all situations, all clients will not be performing maximum IOPS at the same time, thus despite IOPS capacity being oversubscribed, the distributed system may nevertheless be able to meet the TOPS performance guarantees made to clients. As another example, in some embodiments a "physical capacity constraint" for IOPS may be that if a resource host is currently performing TOPS at or above a threshold amount, e.g. 90% of the resource host's TOPS capacity, then no additional resource instances may be placed on the resource host. This may partially guarantee that the resource host does not become IOPS limited, wherein the resource host is unable to meet one or more IOPS performance guarantees. In some embodiments, various other placement constraints may be implemented for a distributed system.

For some resource instances, such as high performance storage volumes, large compute instances, or other types of resource instances, a local placement domain placement constraint may be associated with the resource instance. In some embodiments, a local placement domain placement constraint may require that a resource instance be placed in a same placement domain where a resource instance to which the resource instance is to be attached is already placed or will be placed. For example, in some embodiments, a high performance storage volume may be placed in a same network spine as a compute instance to which it is to be attached. In some embodiments, placing the storage volume in a same placement domain as a compute instance to which it is to be attached may improve performance of both the storage volume and the compute instance. For example, communication latencies between the storage volume and compute instance may be lower than if the resource instance where not placed in the same placement domain. For example, local network spine placement may eliminate or reduce latencies due to queuing at a router, loss of packets at a router, and may benefit from fewer network hops during communications. In some embodiments, a performance level of a resource instance may require the resource instance be placed in a same placement domain with resource instances to which it is attached. For example, a high performance storage volume may require placement in a same placement domain as a compute instance to which it is attached in order for the distributed system to meet one or more performance guarantees for the high performance volume, such as a read latency or write latency guarantee.

In systems that are operating at or near capacity, local placement domain placement may be limited due to a lack of capacity of resource hosts in a particular placement domain within one or more constraints, such as infrastructure diversity constraints, durability constraints, physical capacity constraints, reserved capacity constraints, TOPS constraints, etc., to place a resource instance in the particular placement domain where a resource instance to which it is to be attached is also placed. Such a situation may result, in at least some circumstances, due to a first resource instance being placed in a placement domain that lacks sufficient capacity to accept placement of a second resource instance to be attached to the first resource instance. In other circumstances, a distributed system may have an imbalanced capacity or lack of capacity such that few or none of the placement domains of the distributed system include sufficient capacity within one or more placement constraints to accept placement of both the first and second resource instance in the same placement domain. For example, in some situations, a compute resource instance may be placed in a placement domain that lacks sufficient storage host capacity to accept placement of a storage host to be attached to the compute resource instance within one or more placement constraints of the distributed system. As another example, a distributed system, may include some placement domains with sufficient storage host capacity, but insufficient compute host capacity to accept placement of the compute resource instance within one or more placement constraints of the distributed system. The distributed system may also include other placement domains with sufficient compute capacity, but insufficient storage host capacity to accept placement of the compute instance within one or more placement constraints of the distributed system.

In some embodiments, a resource placement manager of a distributed system may implement one or more application programming interfaces (APIs) for creating resource instances, wherein a resource instance to which the requested resource instance is to be attached may be indicated. For example, a create volume API may accept an indication of a compute instance to which a requested volume is to be attached. In such embodiments, a resource manager may place the requested volume in a placement domain, such as a network spine, where the compute instance to be attached is already placed. This is in contrast to other systems that include an interface to request creation of a volume, but do not take into account a location of a compute instance to be attached to the volume. In such other systems, the volume may be arbitrarily placed without consideration of a location of a compute instance to which it is to be attached.

In some embodiments, a client may request, via an API, a compute instance be implemented and attached to a specified volume placed on a resource host in a particular placement domain, such as a network spine of the distributed system. Also, in some embodiments, a client may specify a placement group in a particular placement domain, such as a particular network spine, data center, or availability zone of a provider network and then place resource instances in the placement group, wherein a spine local, data center local, or availability zone local placement constraint is enforced when placing resource instances for the placement group.

As can be seen, such APIs that include an indication of a resource instance to which a requested resource instance is to be attached may provide a resource placement manager with sufficient information to place the resource instance in a same placement domain as the resource instance to which it is to be attached.

In some situations, despite receiving sufficient information to determine a particular placement domain, such as a network spine, at which a requested resource instance is to be placed or where a modified resource instance is to be placed, there may be insufficient resource host capacity at the particular placement domain within one or more resource placement constraints of the distributed system to place the resource instance in the particular placement domain. In such situations, in some embodiments, a resource placement manager may perform a "jam" placement of a resource instance. In a "jam" placement a resource instance may be placed on a resource host in a particular placement domain, such as a network spine, despite violating one or more placement constraints of the distributed system. In some embodiments, the distributed system may include tiered placement constraints, wherein a different set of placement constraints are applied to "jam placements." Additionally, in some embodiments, a distributed system, may minimize an amount of time for which the one or more placement constraints are violated by performing one or more mitigating actions to return one or more capacities of the resource hosts of the particular placement domain to within the one or more placement constraints.

As an example, a placement constraint may be that no additional volumes are to be placed in a network spine when storage hosts of the network spine are at or above 90% of the physical storage capacity of the storage hosts. However, when performing a "jam" placement the distributed storage system may allow placement of a volume up to 95% of the physical storage capacity of the storage hosts. Thus, a volume may be "jam" placed despite the storage hosts of the particular network spine being at or above 90% capacity. However, in order to minimize an amount of time for which the placement constraint is violated, the resource placement manager may perform one or more mitigating actions, such as migrating one or more volumes that do not require spine local placement from being placed on resource hosts of the particular network spine to instead being placed on resource hosts of another network spine that is not capacity constrained. Once, the migration of the other volume that does not require spine local placement is complete and/or migration of one or more other volumes that do not require spine local placement is complete, the capacity of the storage hosts of the particular network spine may be returned to a state that complies with the one or more placement constraints. For example, the utilized physical storage capacity of the storage hosts of the particular network spine may be returned to a level at or below 90%, as an example. In a similar manner other types of resource instances, such as compute instances, object-based storage instances, database instances, etc. may be "jam" placed while other resource instances that do not require local placement are relocated to other placement domains that are not capacity constrained.

In some embodiments, a system that implements spine local placement includes a provider network comprising a plurality of storage hosts configured to provide storage resources to clients of the provider network, a plurality of compute hosts configured to provide compute resources to clients of the provider network, and a plurality of network routers that connect respective sets of the storage hosts and respective sets of the compute hosts to form respective network spines of the provider network. The provider network also includes a resource placement manager configured to receive an indication that a storage volume is to be placed in accordance with a spine local placement requirement and determine one or more current capacities of storage hosts associated with a particular network spine to accept placement of the storage volume relative to one or more placement constraints. The resource placement manager is further configured to, in response to determining the storage hosts associated with the particular network spine lack capacity to accept placement of the storage volume relative to at least one of the one or more placement constraints: place the storage volume on one of the storage hosts associated with the particular network spine, wherein the placement temporarily violates the at least one placement constraint and migrate one or more other volume partitions currently stored on one or more of the storage hosts associated with the particular network spine to one or more storage hosts associated with another one of the network spines, wherein, subsequent to migrating the one or more volumes, the capacity of the storage hosts associated with the particular network spine satisfy the at least one placement constraint.

In some embodiments, a method for implementing local placement includes receiving an indication that a resource instance is to be placed in a provider network in accordance with a local placement requirement, wherein respective networking devices of the provider network connect respective sets of storage hosts and respective sets of compute hosts to form respective placement domains of the provider network and determining one or more capacities of the storage hosts or compute hosts associated with a particular placement domain to accept placement of the resource instance relative to one or more placement constraints. The method further includes, in response to determining the storage hosts or the compute hosts associated with the particular placement domain lack capacity to accept placement of the resource instance relative to at least one of the one or more placement constraints: placing the resource instance on one of the storage hosts or one of the compute hosts associated with the particular placement domain, wherein the placement violates the at least one placement constraint and performing one or more mitigating actions, wherein subsequent to performing the mitigating actions, the storage hosts and compute hosts associated with the particular placement domain satisfy the at least one placement constraint.

In some embodiments, a non-transitory computer readable medium stores program instructions, that when executed by one or more processors, cause the one or more processors to receive an indication that a resource instance is to be placed in a provider network accordance with a local placement requirement, wherein, for each of a plurality of placement domains of the provider network, a networking device of the provider network connects a set of storage hosts and a set of compute hosts of the provider network and determine one or more capacities of the storage hosts or compute hosts associated with a particular placement domain to accept placement of the resource instance relative to one or more placement constraints. The program instructions, when executed by the one or more processors, further cause the one or more processors to, in response to determining the storage hosts or the compute hosts associated with the particular placement domain lack capacity to accept placement of the resource instance relative to at least one of the one or more placement constraints: cause the resource instance to be placed on one of the storage hosts or one of the compute hosts associated with the particular placement domain, wherein the placement violates the at least one placement constraint and cause one or more other resource instances currently placed on one or more of the storage hosts or one or more of the compute hosts associated with the particular placement domain to be relocated to one or more storage hosts or one or more compute hosts associated with another one of the placement domains, wherein subsequent to relocating the one or more other resource instances, the available capacity of the storage hosts and compute hosts associated with the particular placement domain satisfy the at least one placement constraint.

FIG. 1A illustrates a block diagram of a provider network comprising multiple placement domains and a resource placement manager, according to some embodiments.

Provider network 100 includes placement domain 102, placement domain 104, and resource placement manager 120. In some embodiments, as indicated by the ellipses a provider network may include any number of placement domains.

Placement domain 102 comprises storage hosts 106, compute hosts 108, and networking device(s) 114 that is connected via one or more network connections to respective ones of storage hosts 106 and compute hosts 108. In some embodiments, storage hosts 106 and compute hosts 108 may comprise storage servers and compute servers mounted in one or more server racks of a data center. In some embodiments, each server rack may include one or more top of rack switches that connect compute hosts and/or storage hosts mounted in the server rack to a network spine. In some embodiments, a network spine may include one or more networking cabinets comprising one or more networking devices that connect top of rack switches of multiple racks to a router or mesh of routers of a network spine. In some embodiments, networking device 114 may be a top of rack switch and placement domain 102 may include compute and storage hosts in a same rack. In some embodiments, networking device 114 may be a networking cabinet and placement domain may include compute and storage hosts in multiple racks that are connected to the networking cabinet. In some embodiments, networking device 114, may be a router or mesh of routers that connects compute hosts and storage hosts of a network spine and placement domain 102 may be a network spine. In some embodiments, placement domain 102 may be a data center or availability zone of a provider network comprising multiple data centers. In some embodiments, a size of a placement domain may be based on a number of compute and storage hosts that can be connected while still meeting one or more performance and/or reliability requirements for a placement domain. For example, a bandwidth requirement or reliability requirement for network service within a provider network may limit a size of a placement domain. In some embodiments, different types of networking devices may be included in different sizes of placement domains. For example, a router with a greater capacity may be included in a larger placement domain and a router with a smaller capacity may be included in a smaller placement domain. In some embodiments, a larger placement domain may include more resource hosts or resource hosts with greater capacities than are included in a smaller placement domain.

In a similar manner to placement domain 102, placement domain 104 includes storage hosts 110 and compute hosts 112 connected to networking device(s) 116 to form placement domain 104. While storage hosts and compute hosts are labeled separately in FIG. 1A in some embodiments a same server may host storage resource instances and compute resource instances. Also, in some embodiments, a storage server may host storage resource instances and a compute server may host compute resource instances. In some embodiments, compute and storage hosts may be included in the same rack or may be included in different racks. In some embodiments, a placement domain may include equivalent quantities of compute and storage hosts or may include more or fewer compute hosts than storage hosts. As discussed in more detail in regard to FIG. 3, in some embodiments, a placement domain may include compute hosts and storage hosts comprising different physical hardware with different capabilities. For example, some storage hosts may have more IOPS capacity than other storage hosts. Also, some compute hosts may have more computing capacity than other compute hosts.

In some embodiments, resource hosts, such as storage hosts 106 and 110 and compute hosts 108 and 112, may be one or more computing systems, nodes, or devices (e.g., system 1400 in FIG. 14 below) and may be configured to host or implement a resource of the distributed system. Infrastructure units, such as server racks, networking switches, routers, or other components, power supplies (or other resource host suppliers), or physical or logical localities (e.g., locations in a particular row, room, building, data center, fault tolerant zone, etc.) may be utilized to implement resource hosts.

Figure 1B:
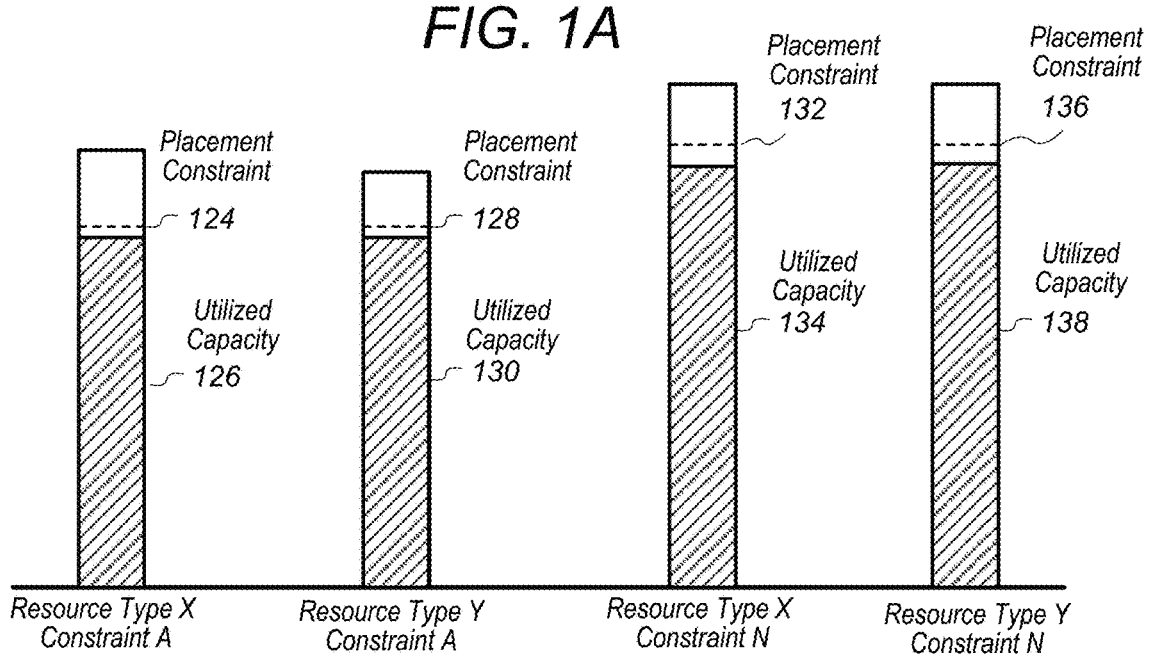
FIG. 1B illustrates a diagram indicating resource utilizations for different types of resources and indicating different placement constraints, according to some embodiments.

FIG. 1B illustrates a diagram indicating resource utilizations for different types of resources and indicating different placement constraints, according to some embodiments.

FIG. 1B shows utilized capacities for resource type X in comparison to constraints A and N and shows utilized capacities for resource type Y in comparison to constraints A and N. For example, resource type X may be storage resources of a placement domain and constraint A may be a physical capacity constraint. Thus, utilized capacity 126 may indicate an amount of physical storage of storage hosts of a particular placement domain, such as placement domain 102, that is currently utilized. Also, placement constraint 124 may indicate a placement constraint for physical storage capacity for storage hosts of a particular placement domain, such as placement domain 102. As another example, resource type Y may be compute resources of a placement domain and constraint N may be a reserved capacity constraint. Thus, utilized capacity 138 may indicate an amount of reserved capacity for compute hosts of a particular placement domain, such as placement domain 102, that is currently utilized. Also, capacity placement constraint 136 may indicate a placement constraint for reserved capacity for compute hosts of a particular placement domain, such as placement domain 102.

In some embodiments, in response to resource placement request(s) 118, resource placement manager 120 may evaluate resource utilization data for resource hosts, such as utilized capacities 126, 130, 134, and 138 for storage hosts 106 and 110 and compute hosts 108 and 112. The utilized capacities may be compared to one or more constraints, such as placement constraints 124, 128, 132, and 136, for placing resources with regard to resource hosts, such as storage hosts 106 and 110 and compute hosts 108 and 112. For example, the placement constraints may be one or more of infrastructure diversity constraints, durability constraints, physical capacity constraints, reserved capacity constraints, TOPS constraints, etc. In some embodiments, a placement constraint may be that a resource instance is to be placed on a resource host having a performance capability that matches or corresponds with an assigned performance capability of the resource instance. For example, a large compute resource instance may have an assigned processor capacity and a placement constraint may be that the large compute resource instance is to be placed on a compute host that includes a processor matching or corresponding to the assigned processor capability of the large compute resource instance.

In some embodiments, a resource placement manager, such as resource placement manager 120, may not place additional storage resource instances on resource hosts of a particular placement domain if the placement of the additional storage resource instance would cause the utilized capacity of a type of resource to exceed a placement constraint, such as causing utilized capacity 126 to exceed placement constraint 124. As an example, resource type Y may be a compute resource type and constraint N may be a reserved capacity constraint. Thus utilized capacity 138 may indicate an amount of reserved compute capacity currently being utilized and placement constraint 136 may indicate a constraint on reserved compute capacity for a given placement domain. In some embodiments, a resource placement manager, such as resource placement manager 120, may not place an additional compute instance on a compute host of a particular placement domain if the placement would cause the currently utilized reserved compute capacity to exceed a placement constraint, such as placement constraint 136. In some embodiments, a placement manager may similarly not place an additional storage resource instance in a particular placement domain if it would cause a utilized storage reserved capacity 134 to exceed placement constraint 132. In some embodiments, a resource placement manager, such as resource placement manager 120, may similarly be restricted from placing additional resource instances in a placement domain if placement of an additional resource instance would cause a currently utilized capacity to exceed a placement constraint for other resource types or for other types of placement constraints.

In some embodiments, the resource placement request 118 may indicate a resource instance, such as a storage volume, is to be placed in accordance with a placement domain local placement requirement. For example the resource placement request 118 may be received via a "create and attach volume API" that allows a volume to be requested and a compute instance to which the volume is to be attached to be specified, wherein the created volume is to be placed in the same placement domain as the compute instance to which it is to be attached is placed. As another example, the resource placement request may be received via a "create and attach compute instance API" that allows a compute instance to be requested and a volume to which the compute instance is to be attached to be specified, wherein the compute instance is to be placed in the same placement domain as the volume to which it is to be attached is placed. As yet another example, the resource placement request 118 may be received via a "placement group API" which allows a client to specify a placement group in a particular availability zone, data center, or network spine, and specify resources, such as compute instances and/or storage volumes that are to be included in the placement group. As yet another example, the placement request 118 may be received via an "attach resource instances API" which allows a client to specify two or more already placed resource instances that are to be modified to be placed in the same placement domain. In some embodiments, a client may have opted into a placement policy wherein all or particular types of resource instances allocated to the client are to be placed according to a placement domain local placement requirement. For example the client may specify that all or certain types of resource instances allocated to the client are to be placed in a particular network spine, data center, or availability zone.

In some situations, resource hosts of a particular placement domain targeted by a placement domain local placement requirement may have sufficient capacity within one or more placement constraints, such as infrastructure diversity constraints, durability constraints, physical capacity constraints, reserved capacity constraints, IOPS constraints, etc. to accept placement of a resource instance without violating one or more placement constraints. In such situations, a resource placement manager, such as resource placement manager 120, may simply place the resource instance on a resource host of the particular placement domain targeted by the placement domain local placement requirement, such as via resource placement decision 122.

However, in other situations, resource hosts of the particular placement domain targeted by the placement domain local placement requirement may not have sufficient capacity within one or more placement constraints, such as infrastructure diversity constraints, durability constraints, physical capacity constraints, reserved capacity constraints, IOPS constraints, etc. to accept placement of a resource instance. In such situations, a resource placement manager, such as resource placement manager 120, may perform a "jam" placement wherein the one or more placement constraints are temporarily violated until one or more currently placed resource instances can be relocated to other resource host(s) of another placement domain.

In some embodiments, different placement constraints may be evaluated separately and an amount to which a given placement constraint may be "jammed" may differ between different placement constraints. For example, a reserved capacity constraint may be "jammed" harder (e.g. further violated) than a physical capacity constraint. Said another way, an acceptable amount to which utilized capacity may exceed a capacity constraint when performing a "jam" placement may vary for different capacity constraints.

In some embodiments, a distributed system may maintain two or more tiers of placement constraints, wherein a first tier of constraints are enforced when a placement domain is not "jammed" and another tier of constraints are enforced when a placement domain is "jammed." In some embodiments, one or more placement constraints may be temporarily relaxed when a placement domain is "jammed" and more strictly enforced once the "jammed" conditions of the particular placement domain are mitigated, for example by relocating resource instances that do not require placement domain local placement to other placement domains.

In some embodiments, "jam" placement of a resource instance in a placement domain may temporarily reduce performance of one or more resource instances placed on resource hosts of the placement domain. For example, in some embodiments, lower priority resource instances placed on a particular network spine may be throttled while the network spine is "jammed." This may be done in order to ensure one or more performance guarantees are met for higher performance resource instances.

Figure 1C:
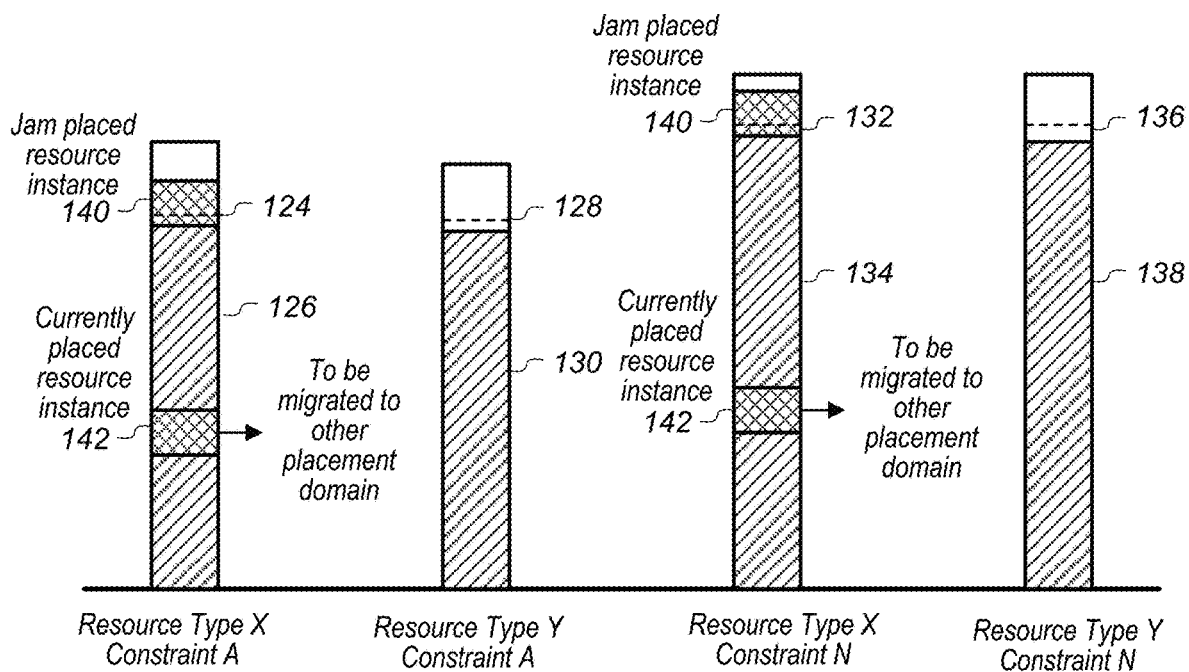
FIG. 1C illustrates a diagram indicating resource utilizations for different types of resources and indicating different placement constraints, wherein a resource instance is being jam placed, according to some embodiments.

FIG. 1C illustrates a diagram indicating resource utilizations for different types of resources and indicating different placement constraints, wherein a resource instance is being "jam" placed, according to some embodiments.

For example, resource instance 140 may be "jam" placed onto one or more resource hosts of a particular placement domain despite the placement of resource instance 140 temporarily causing one or more placement constraints to be violated. For example, resource instance 140 may be a storage resource instance (e.g., a volume or one or more partitions of a volume, such as in embodiments where volumes are composed of a plurality of partitions and each partition is stored on a separate storage device) being "jam" placed on a storage host 106 of placement domain 102, as an example. Placement of the storage resource instance 140 may cause a physical storage capacity constraint, such as constraint 124, to be violated, and may also cause a reserved storage capacity constraint, such as capacity placement constraint 132, to be violated. However, in order to return a particular placement domain, such as placement domain 102, to a state wherein capacity placement constraints 124 and 132 are not violated, a resource placement manager, such as resource placement manager 120, may migrate one or more volumes currently placed on storage hosts of the particular placement domain to one or more other placement domains of the provider network that are not storage capacity limited. For example, resource placement manager may migrate one or more storage volume implemented on storage hosts 106 of placement domain 102 to instead being implemented on storage hosts 110 of placement domain 104. In some embodiments, a storage volume being migrated, such as storage volume 142, may be a storage volume that does not require placement domain local placement. For example, the storage volume may be a lower performance storage volume than a storage volume implemented via jam placed resource instance 140.

Figure 1D:
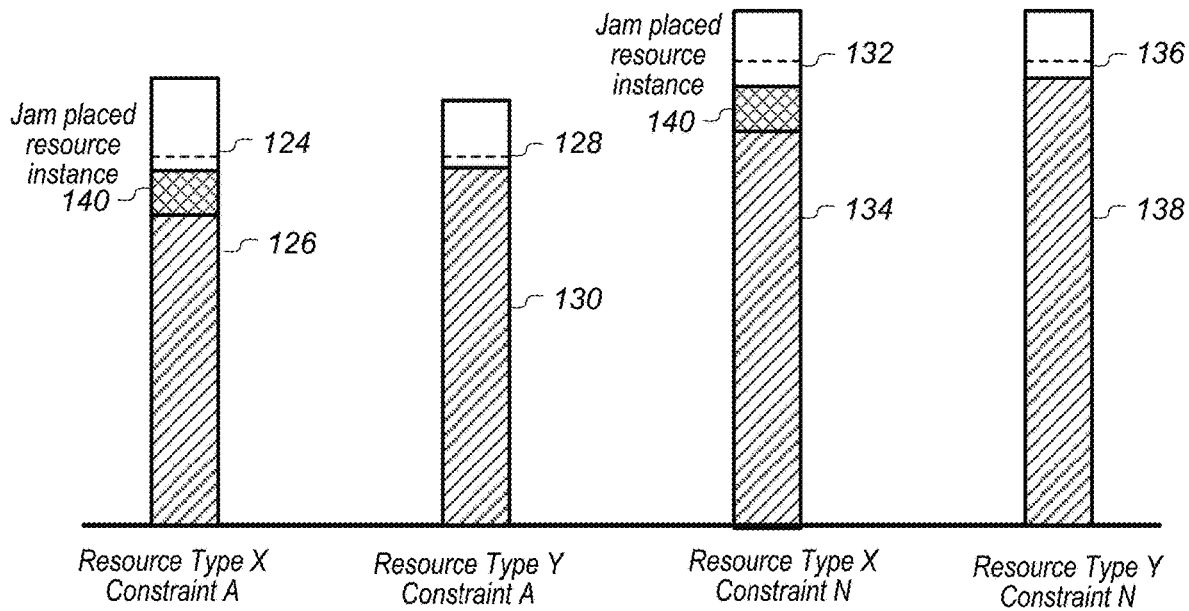
FIG. 1D illustrates a diagram indicating resource utilizations for different types of resources and indicating different placement constraints subsequent to one or more mitigating actions being performed after jam placement of a resource instance, according to some embodiments.

FIG. 1D illustrates a diagram indicating resource utilizations for different types of resources and indicating different placement constraints subsequent to one or more mitigating actions being performed after "jam" placement of a resource instance, according to some embodiments.

Once one or more mitigating actions have been performed, such as migrating one or more storage volumes to other placement domains, utilized capacities of resource hosts of the particular placement domain may be reduced such that they comply with the one or more placement constraints previously violated by the "jam" placement. For example, subsequent to migrating the resource instance that implements storage volume 142 to another placement domain, utilized capacity 126 is within placement constraint 124 and utilized capacity 134 is within placement capacity constraint 132. Note that "jam" placed resource instance 140 remains placed in the particular placement domain after the placement domain is brought within the one or more placement constraints.

Also, please note that previous descriptions are not intended to be limiting, but are merely provided as an examples of placement domain local placements and "jam" placements with regard to various placement constraints, resource types, etc. Various other combinations of resource types and placement constraints may be similarly evaluated and a "jam" placement may be made in response to such evaluation.

As discussed in more detail in regard to FIG. 8, in some embodiments, a "jam" placement may include a "jam" placement of a resource instance and a "jam" placement of an associated replica for the resource instance. Also, as discussed in more detail in regard to FIG. 3, in some embodiments a service level agreement or service level guarantee for a type of resource, such as high performance volume, may include a placement domain local placement requirement. For example, in order to meet the service level guarantee for the high performance volume, the volume may be required to be placed in a same placement domain as a compute instance to which it is attached. In some embodiments, a high performance volume and compute instance may communicate using one or more protocols that require low latency such as an RRD protocol.

In some embodiments, "jam" placement of resource instances may allow for more flexibility than is allowed when placement constraints are strictly enforced without exceptions. For example, in some embodiments, a resource placement manager may more fully utilize resource capacity of resource hosts of one or more placement domains of a provider network while reserving less capacity to place future placement domain local resource instances than would be required if "jam" placement was not permitted. This is because if a placement constraint, given a current utilized capacity, does not allow for placement of a particular resource instance requiring placement domain local placement, the resource placement manager can nevertheless "jam" place the resource instance and relocate a currently placed resource instance from the particular placement domain to another placement domain.

Figure 2:
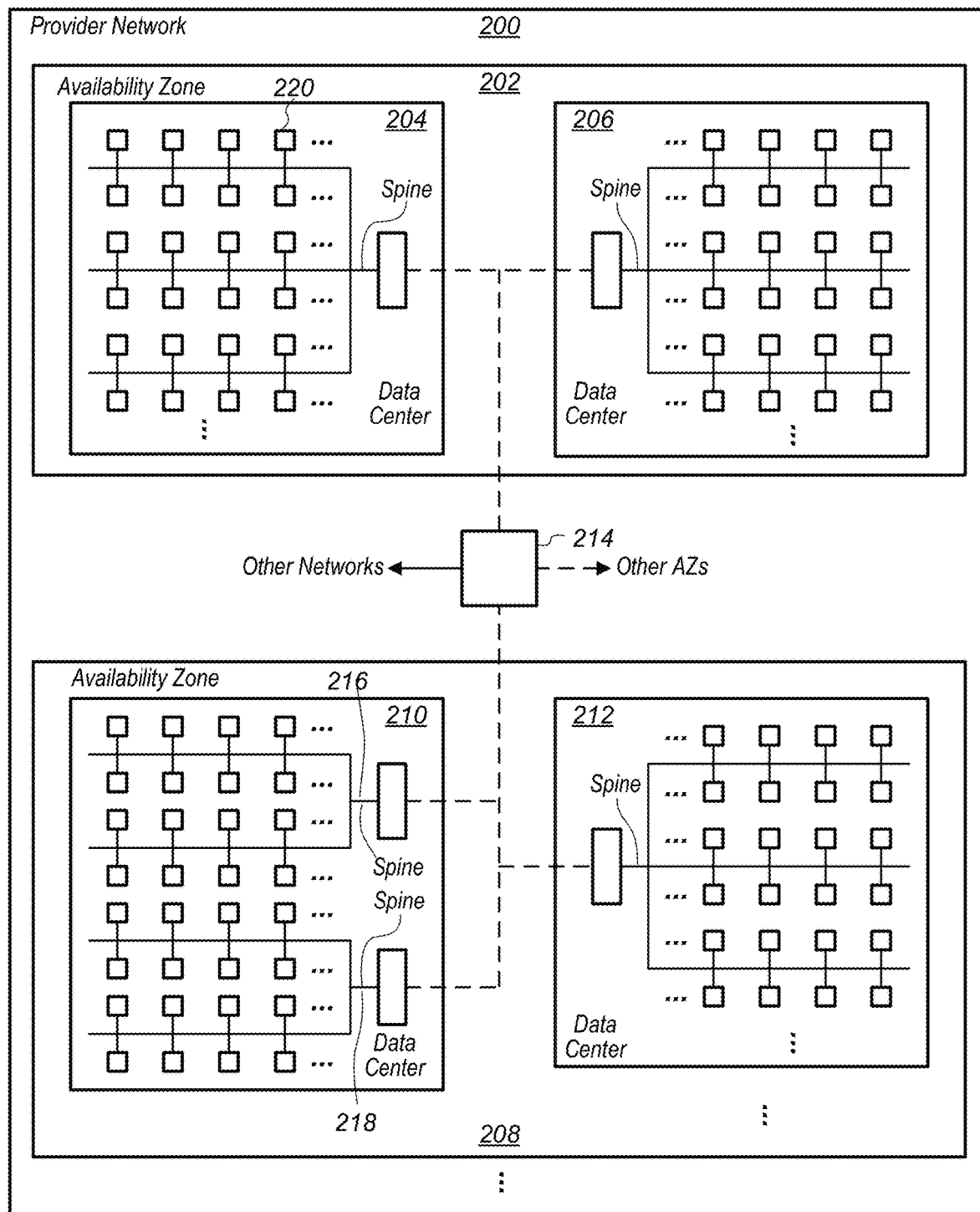
FIG. 2 is a block diagram illustrating a provider network comprising multiple availability zones, data centers, and network spines, according to some embodiments.

FIG. 2 is a block diagram illustrating a provider network comprising multiple availability zones, data centers, and network spines, according to some embodiments.

Provider network 200 includes availability zone 202 and 208. Availability zone 202 includes data centers 204 and 206, which each include a single network spine. Availability zone 208 includes data centers 210 and 212. Data center 212 includes a single network spine, and data center 210 includes two network spines, spine 216 and 218. Provider network 200 may be a similar provider network as provider network 100. In some embodiments, each of the spines included in data centers 204, 206, 210, and 212 may include storage hosts, compute hosts, and a networking device, such as a router, such as placement domains 102 and 104 illustrated in FIG. 1A. In some embodiments, as indicated by ellipses, a network spine may include any number of storage hosts and/or compute hosts. Also, as indicated by ellipses, in some embodiments, a network spine may include any number of aisles of racks that include compute and/or storage servers that function as compute hosts and/or storage hosts. For example, data center 204 may include any number of racks 220 that include compute and/or storage servers mounted in the racks and organized into aisles in data center 204. In some embodiments, replicas of resource instance may be placed in compute or storage hosts located in different racks of a common network spine. For example, in some embodiments a storage volume may be placed on a storage host in a particular one of racks 220 in data center 204 and a replica of the storage volume may be placed on another storage host located in another one of the racks 220 in data center 204. In some embodiments, a given one of racks 220 may include compute servers that function as compute hosts, storage servers that function as storage hosts, or a combination of types of resources, e.g. both compute and storage servers that function as both compute and storage hosts.

In some embodiments, a provider network such as provider network 200, may include a transit center, such as transit center 214. A transit center, such as transit center 214, may include one or more large scale routers or other types of networking devices. A transit center, such as transit center 214, may provide connections and routing between network spines such as the different network spines in data centers 204, 206, 210, and 212 and network spines in other availability zones of a provider network. Also, a transit center may provide connections to other networks such as client networks or public networks, such as the Internet.

Figure 3A:
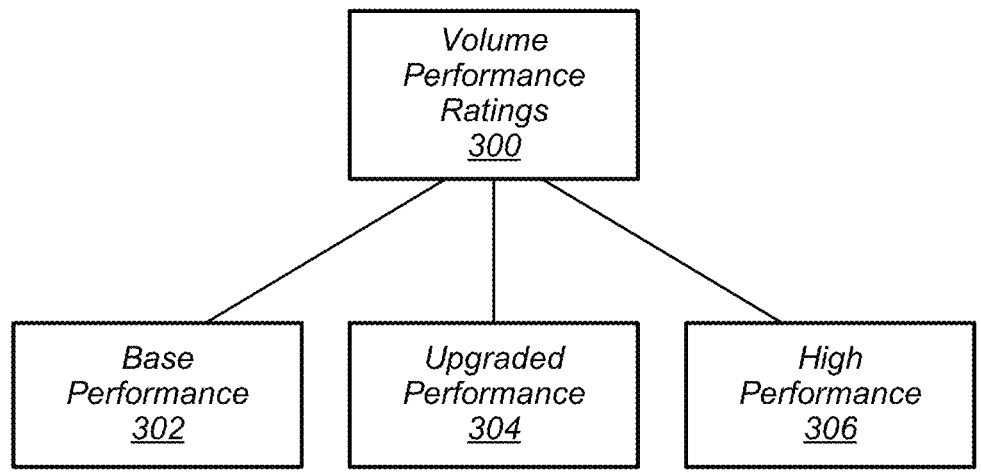
FIG. 3A is a diagram illustrating different performance levels for storage volumes offered by a block-based storage service, according to some embodiments.

FIG. 3A is a diagram illustrating different performance levels for storage volumes offered by a block-based storage service, according to some embodiments.

In some embodiments, for example, in the case of storage servers, the performance capacities of different storage mediums, such as solid state storage mediums, disk storage mediums, tape storage mediums, etc. and other components of storage servers such as memory size, IOPS capacity, etc. may vary. Also resource instances may have assigned performance capabilities. In some embodiments, resource instances may be implemented on underlying hardware that have performance capabilities that match or correspond to the assigned performance capabilities of the resource instances. FIG. 3A shows an example classification of volumes based on volume performance ratings 300. High performance volumes 306 may have more IOPS capacity than upgraded volumes 304, which in turn may have more TOPS capacity than base volumes 302. In some embodiments, in order to meet a service level agreement for a high performance volume or an upgraded performance volume, for example a guaranteed number of IOPS, it may be necessary to place the high performance volume or the upgraded volume in a same placement domain as a compute resource instance to which it is attached. Also, in some embodiments, a lower performance volume, such as a base performance volume 302, may not require placement domain local placement in order to satisfy a service level guarantee, such as IOPS. In some embodiments, a high-performance volume, such as a high performance volume 306, may be "jam" placed into a particular placement domain, such as a network spine, and a lower performance volume(s), such as base performance volume 302, may be migrated to another placement domain, such as another network spine, in order to return the placement domain to within one or more placement constraint limits subsequent to a "jam" placement. In some embodiments, different types of resource instances, such as volume, may require different types of placement domain local placement. For example, in some embodiments, higher performance volumes may require placement in a narrower placement domain than lower performance volumes. For example, some volumes may require local placement in a same availability zone as a resource instance to be attached to the volume, whereas other volumes may require local placement in a same network spine, data center, aisle connected to a common networking cabinet, or rack, as a compute instance to be attached to the volume.

Figure 3B:
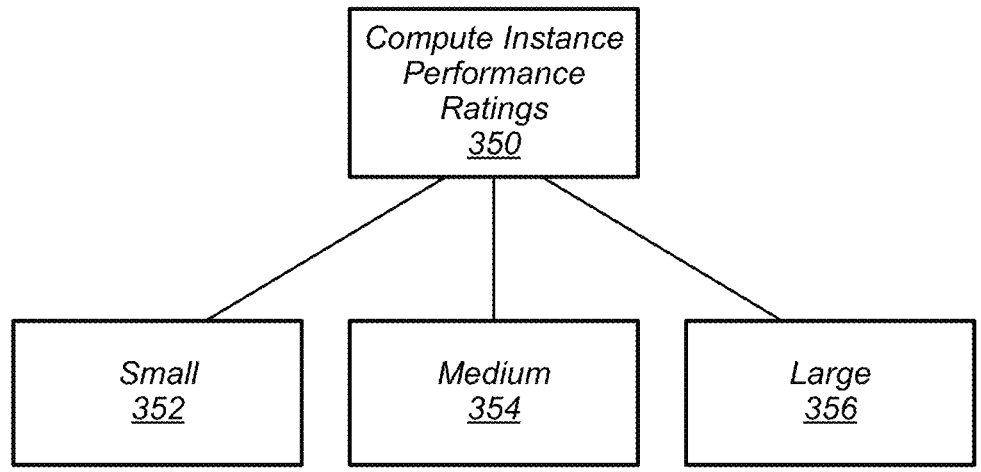
FIG. 3B is a diagram illustrating different sizes of compute instances offered by a virtual compute service, according to some embodiments.

FIG. 3B is a diagram illustrating different sizes of compute instances offered by a virtual compute service, according to some embodiments.

In some embodiments, for example, in the case of compute resource instances, the performance capacities of different CPUs and other components of compute servers such as memory size may vary. FIG. 3B shows an example classification of compute instances based on instance performance ratings 350. Large instances 356 may have more computing capacity than medium instances 354, which in turn may have more computing capacity than small instances 352. In some embodiments, software features such as operating systems, hypervisors, middleware stacks and the like may also be taken into account in determining ratings associated with various compute instances.

In some embodiments, a resource placement manager may be constrained to place resource instances on resource hosts that have performance capabilities that correspond to assigned performance capabilities for a resource instance. For example, high-performance volumes may be constrained to being placed on solid-state storage devices and base or upgraded performance volumes may be constrained to being placed on hard disk drive based storage devices. As another example, large compute instance may be constrained to being placed on compute hosts with higher performance processors than other compute hosts.

However, in some embodiments, such a constraint may be violated during a "jam" placement. For example, an upgraded performance volume may have assigned performance capabilities corresponding to placement on hard disk drive based storage devices and may also require placement domain local placement with a compute instance to which it is to be attached. However, if an upgraded performance volume is to be placed in a particular placement domain where a compute instance to which it is to be attached is already placed and if the particular placement domain lacks sufficient storage host capacity for hard disk drive based storage devices, the upgraded performance volume may be implemented on a storage resource instance that is "jam" placed on a solid-state based storage device. The upgraded performance volume may later be migrated to a hard-disk drive based storage device in the same placement domain after one or more mitigating actions are performed such as migrating base performance volumes also implemented on hard-disk drive storage devices to other placement domains of the provider network that are not constrained in regard to hard-disk drive based storage devices. In a similar manner compute instances may be "jam" placed on computer hardware that exceeds one or more performance capabilities assigned for the compute instance and may be later relocated to compute hardware that corresponds with the one or more performance capabilities assigned for the compute instance.

For example, in some embodiments, a medium or small compute instance may be "jam" placed on hardware corresponding to a large compute instance performance rating, and may be later relocated to hardware corresponding to the assigned performance capabilities for the compute instance.

Figure 4:
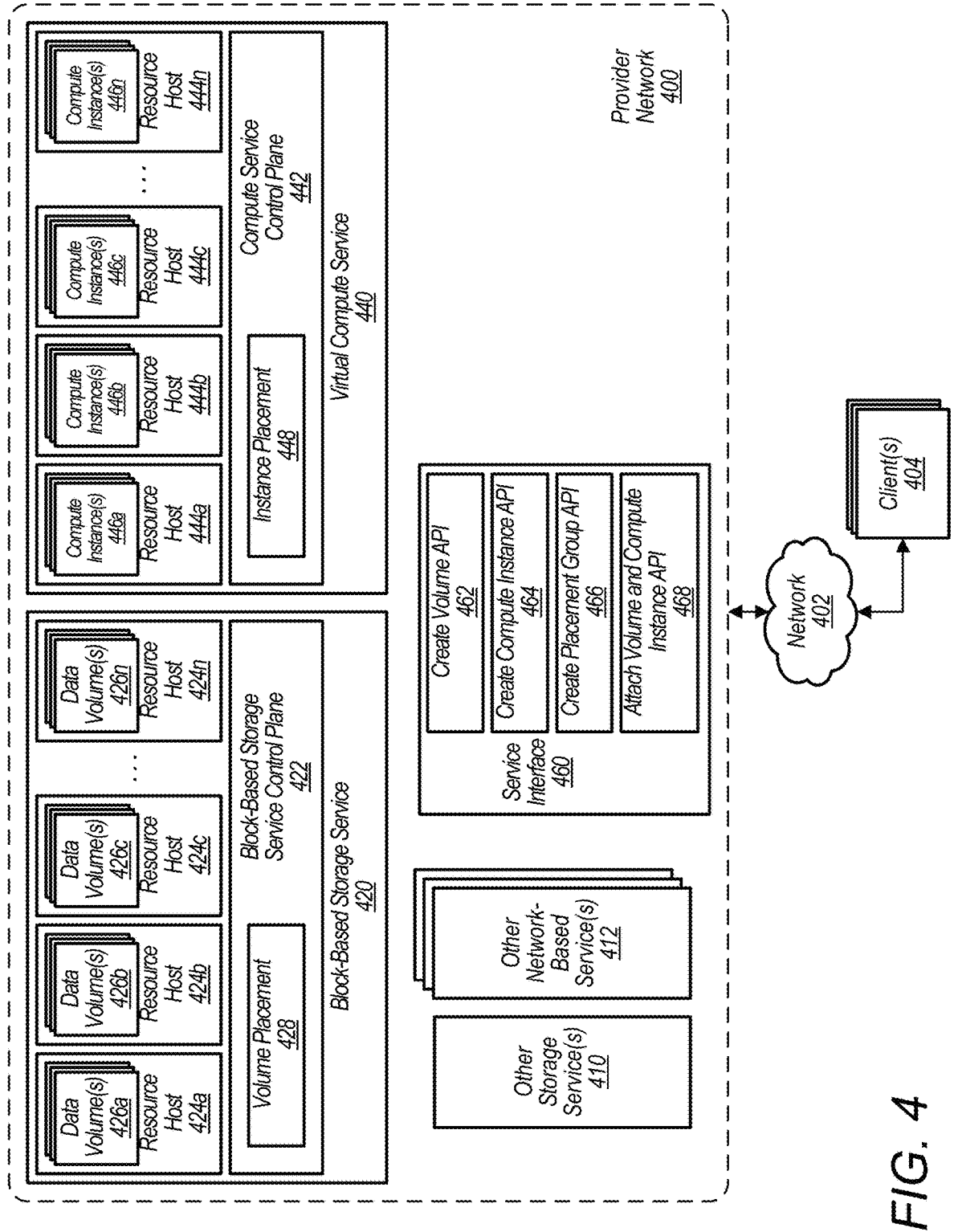
FIG. 4 is a block diagram illustrating a provider network implementing multiple network-based services including a block-based storage service and virtual compute service that support local placement, according to some embodiments.

FIG. 4 is a block diagram illustrating a provider network implementing multiple network-based services including a block-based storage service and virtual compute service that support local placement, according to some embodiments.

Provider network 400 may be set up by an entity such as a company or a public sector organization to provide one or more services (such as various types of cloud-based computing or storage) accessible via the Internet and/or other networks to clients 404. In some embodiments, provider network 400 may be the same as provider network 100 and 200 described in FIGS. 1A and 2. Provider network 400 may include numerous data centers (such as the data centers and network spines described in regard to FIG. 2, above) hosting various resource pools, such as collections of physical and/or virtualized computer servers, storage devices, networking equipment and the like (e.g., computing system 1400 described below with regard to FIG. 14), needed to implement and distribute the infrastructure and services offered by the provider network 400. In some embodiments, provider network 400 may provide computing resources, such as virtual compute service 440, storage services, such as block-based storage service 420 and other storage service 410 (which may include various storage types such as object/key-value based data stores or various types of database systems), and/or any other type of network-based services 412. Clients 404 may access these various services offered by provider network 400 via network 402. Likewise network-based services may themselves communicate and/or make use of one another to provide different services. For example, computing resources offered to clients 404 in units called "instances," such as virtual or physical compute instances or storage instances, may make use of other resources, such as particular data volumes 426, providing virtual block storage for the compute instances.

As noted above, virtual compute service 440 may offer various compute instances to clients 446. A virtual compute instance may, for example, be implemented on one or more resource hosts 444 that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 440 in different embodiments, including special purpose computer servers, storage devices, network devices and the like. In some embodiments instance clients 404 or any other user may be configured (and/or authorized) to direct network traffic to a compute instance. In various embodiments, compute instances may attach or map to one or more data volumes 426 provided by block-based storage service 420 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 404 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 400 may also implement block-based storage service 420 for providing storage resources and performing storage operations. Block-based storage service 420 is a storage system, composed of a pool of multiple independent resource hosts 424a, 424b, 424c through 424n (e.g., server block data storage systems), which provide block level storage for storing one or more sets of data volumes data volume(s) 426a, 426b, 426c, through 426n. Data volumes 426 may be mapped to particular clients, providing virtual block-based storage (e.g., hard disk storage or other persistent storage) as a contiguous set of logical blocks. In some embodiments, a data volume 426 may be divided up into multiple data chunks (including one or more data blocks) for performing other block storage operations, such as snapshot operations or replication operations. A volume snapshot of a data volume 426 may be a fixed point-in-time representation of the state of the data volume 426. In some embodiments, volume snapshots may be stored remotely from a resource host 424 maintaining a data volume, such as in another storage service 410. Snapshot operations may be performed to send, copy, and/or otherwise preserve the snapshot of a given data volume in another storage location, such as a remote snapshot data store in other storage service 410.

Block-based storage service 420 may implement block-based storage service control plane 422 to assist in the operation of block-based storage service 420. In a similar manner, virtual compute service 440 may implement compute service control plane 442 to assist in operation of virtual compute service 440. In various embodiments, block-based storage service control plane 422 assists in managing the availability of block data storage to clients, such as programs executing on compute instances provided by virtual compute service 440 and/or other network-based services located within provider network 400 and/or optionally computing systems (not shown) located within one or more other data centers, or other computing systems external to provider network 400 available over a network 402. Access to data volumes 426 may be provided over an internal network within provider network 400, for example to compute instances 446, or externally via network 402, for example to clients 404, in response to block data transaction instructions.

Block-based storage service control plane 422 may provide a variety of services related to providing block level storage functionality, including the management of user accounts (e.g., creation, deletion, billing, collection of payment, etc.). In a similar manner, compute service control plane 442 may provide a variety of services related to providing compute functionality, including the management of user accounts (e.g., creation, deletion, billing, collection of payment, etc.). Block-based storage service control plane 422 may further provide services related to the creation, usage and deletion of data volumes 426 in response to configuration requests. Also, compute service control plane 442 may provide services related to the creation, usage and deletion of compute instances 446 in response to configuration requests. In at least some embodiments, block-based storage service control plane may implement volume placement 428 and compute service control place 442 may implement instance placement 448, such as described in further detail below with regard to FIGS. 7A-B.

Provider network 400 may also implement another storage service 410, as noted above. Other storage service 410 may provide a same or different type of storage as provided by block-based storage service 420. For example, in some embodiments other storage service 410 may provide an object-based storage service, which may store and manage data as data objects. For example, volume snapshots of various data volumes 426 may be stored as snapshot objects for a particular data volume 426. In addition to other storage service 410, provider network 400 may implement other network-based services 412, which may include various different types of analytical, computational, storage, or other network-based system allowing clients 404, as well as other services of provider network 400 (e.g., block-based storage service 420, virtual compute service 440 and/or other storage service 410) to perform or request various tasks.

Clients 404 may encompass any type of client configurable to submit requests to network provider 400. For example, a given client 404 may include a suitable version of a web browser, or may include a plug-in module or other type of code module configured to execute as an extension to or within an execution environment provided by a web browser. Alternatively, a client 404 may encompass an application such as a database application (or user interface thereof), a media application, an office application or any other application that may make use of compute instances 446, a data volume 426, or other network-based service in provider network 400 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 404 may be configured to generate network-based services requests according to a Representational State Transfer (REST)-style network-based services architecture, a document- or message-based network-based services architecture, or another suitable network-based services architecture. In some embodiments, a client 404 (e.g., a computational client) may be configured to provide access to a compute instance 446 or data volume 426 in a manner that is transparent to applications implemented on the client 404 utilizing computational resources provided by the compute instance 446 or block storage provided by the data volume 426.

Clients 404 may convey network-based services requests to provider network 400 via external network 402. In various embodiments, external network 402 may encompass any suitable combination of networking hardware and protocols necessary to establish network-based communications between clients 404 and provider network 400. For example, a network 402 may generally encompass the various telecommunications networks and service providers that collectively implement the Internet. A network 402 may also include private networks such as local area networks (LANs) or wide area networks (WANs) as well as public or private wireless networks. For example, both a given client 404 and provider network 400 may be respectively provisioned within enterprises having their own internal networks. In such an embodiment, a network 402 may include the hardware (e.g., modems, routers, switches, load balancers, proxy servers, etc.) and software (e.g., protocol stacks, accounting software, firewall/security software, etc.) necessary to establish a networking link between given client 404 and the Internet as well as between the Internet and provider network 400. It is noted that in some embodiments, clients 404 may communicate with provider network 400 using a private network rather than the public Internet.

In some embodiments, a provider network, such as provider network 400, may implement service interfaces 460 that allow clients, such as client(s) 404 to, submit one or more requests to services of the provider network, such as block-based storage service 420, virtual compute service 440, other storage service 410, and other network based services 412. In some embodiments, service interfaces may include one or more application programming interfaces (APIs) for interacting with the services of the provider network. For example, service interface 460 includes "create volume and attach" API 462, "create compute instance and attach" API 464, "create placement group" API 466 and "attach volume and compute instance" API 468.

In some embodiments, a "create volume and attach" API 462 may allow a volume to be requested and a compute instance to which the volume is to be attached to be specified, wherein the created volume is to be placed in the same placement domain as the compute instance to which it is to be attached is placed. In some embodiments, a "create compute instance and attach" API 464 may allow a compute instance to be requested and a volume to which the compute instance is to be attached to be specified, wherein the compute instance is to be placed in the same placement domain as the volume to which it is to be attached is placed. In some embodiments, a "create placement group" API 466 may allow a client to specify a placement group in a particular availability zone, data center, or network spine, and specify resources, such as compute instances and/or storage volumes that are to be included in the placement group. In some embodiments, an "attach volume and compute instance" API 468 may allow a client to specify two or more already placed resource instances that are to be modified to be placed in the same placement domain.

Figure 5:
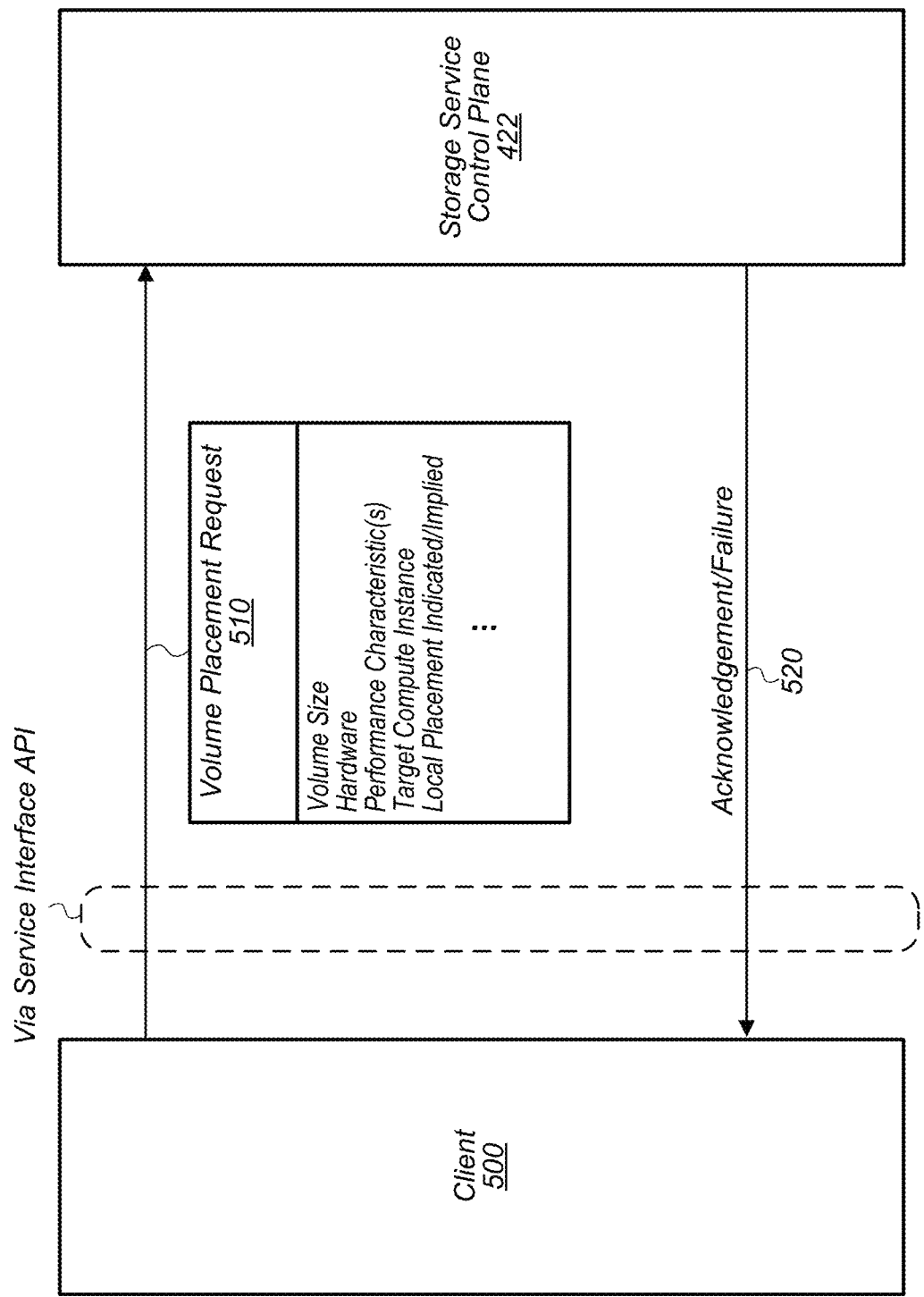
FIG. 5 is a block diagram illustrating a volume placement request for a block-based storage service, according to some embodiments.

FIG. 5 is a block diagram illustrating a volume placement request for a block-based storage service, according to some embodiments.

Volume placement requests may occur as a result of a request to create a new volume, (e.g., to place a new master/slave replica) or to move a currently existing volume from a current resource host to a new resource host, for example to attach the volume to an already placed compute instance or to move the volume to a specified placement group. As illustrated in FIG. 5, various information about the volume placement request 510 may be provided from a client 500 (which may be an external client 404 or other internal system, component, service or device). For example, in some embodiments a request 510 may be a request from some component internal to or within the control plane for a service, either for the block-based storage service itself (in which case the request may directed specifically to a placement manager, such as volume placement 428). Volume placement request 510 may include various information about the volume to place, including the volume size, hardware (e.g., SSD or HDD), performance characteristics (e.g., number of IOPs), location (e.g., data center, fault tolerant zone), and/or client devices accessing the volume. Additionally, the volume request 510 may indicate or imply whether placement domain local placement is required for the volume, and, if so, a target compute instance to which the volume is to be attached. For instance, in some embodiments, a data volume may be placed to serve as virtual block storage for a virtual compute instance, such as may be provided by virtual computing service 440 in FIG. 4 discussed above. The placement request may identify the particular virtual compute instance to which the data volume is to be "attached" or otherwise providing virtual block storage. In some embodiments, request 510 may identify a logical group, such as a placement group, or association within which the resource may be placed (e.g., particular resource hosts/infrastructure units mapped to the logical group may be identified). The volume placement request may succeed or fail, with the appropriate acknowledgement or failure 520 sent in return.

Figure 6:
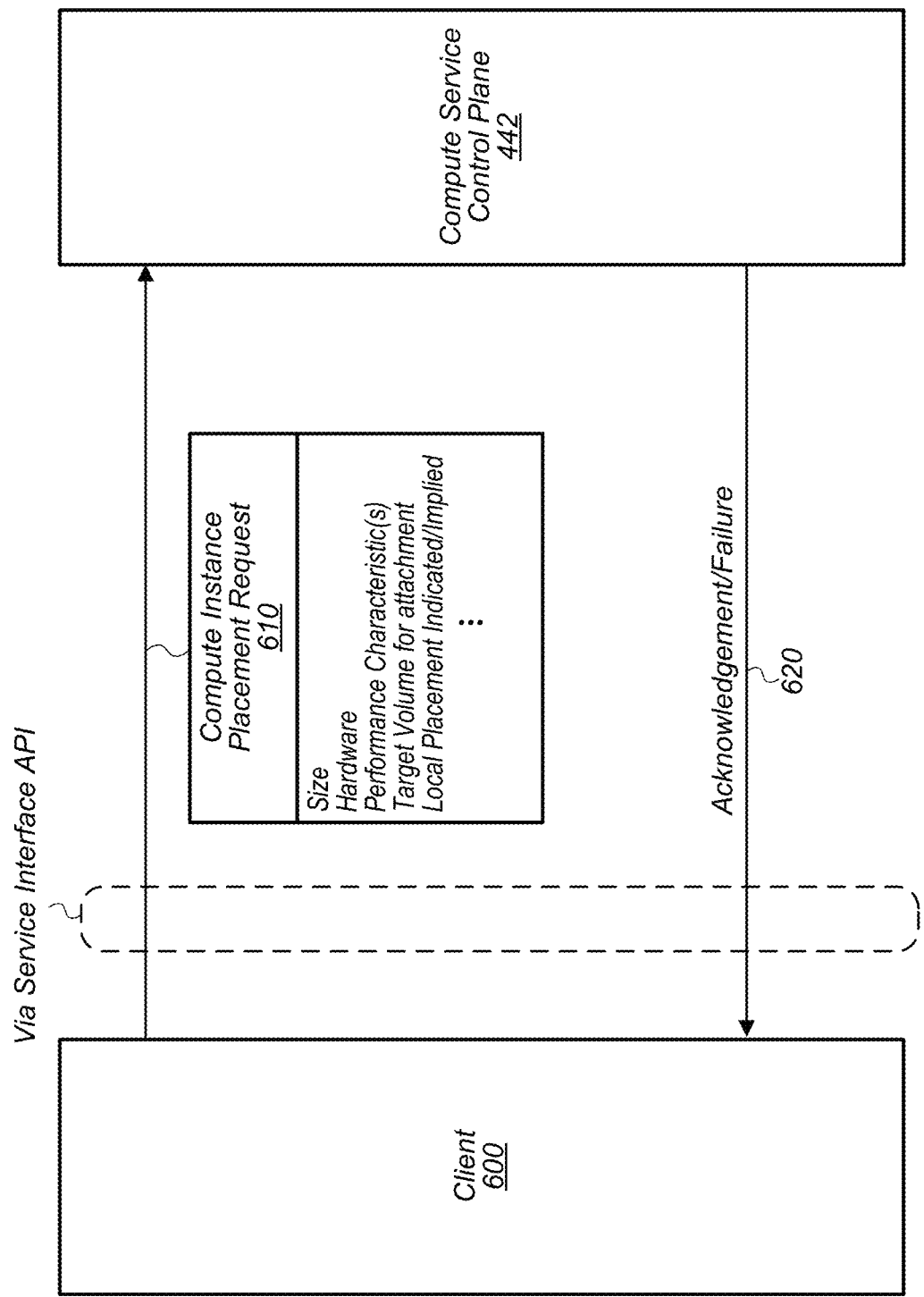
FIG. 6 is a block diagram illustrating a compute instance placement request for a virtual compute service, according to some embodiments.

FIG. 6 is a block diagram illustrating a compute instance placement request for a virtual compute service, according to some embodiments.

Compute instance placement requests may occur as a result of a request to create a new compute instance, or to move a currently existing compute instance from a current resource host to a new resource host. As illustrated in FIG. 6, various information about the compute instance placement request 610 may be provided from a client 600 (which may be an external client 404 or other internal system, component, service or device). Compute instance placement request 610 may include various information about the compute instance to place, including the size, hardware (e.g., processor type), performance characteristics (e.g., processing capacity, software stack, etc.), location (e.g., data center, fault tolerant zone), and/or client devices attached to the compute instance. For instance, in some embodiments, a compute instance may be placed and attached to virtual block storage for the compute instance, such as may be provided by virtual block-based storage service 420 in FIG. 4 discussed above. The placement request may identify the particular data volume to which the compute instance is to be "attached." Additionally, the compute instance request 610 may indicate whether placement domain local placement is required for the compute instance, and, if so, a target volume to which the compute instance is to be attached. In some embodiments, request 610 may identify a logical group or association, such as a placement group, within which the compute instance may be placed (e.g., particular resource hosts/infrastructure units mapped to the logical group may be identified). The compute instance placement request may succeed or fail, with the appropriate acknowledgement or failure 620 sent in return.

Figure 7A:
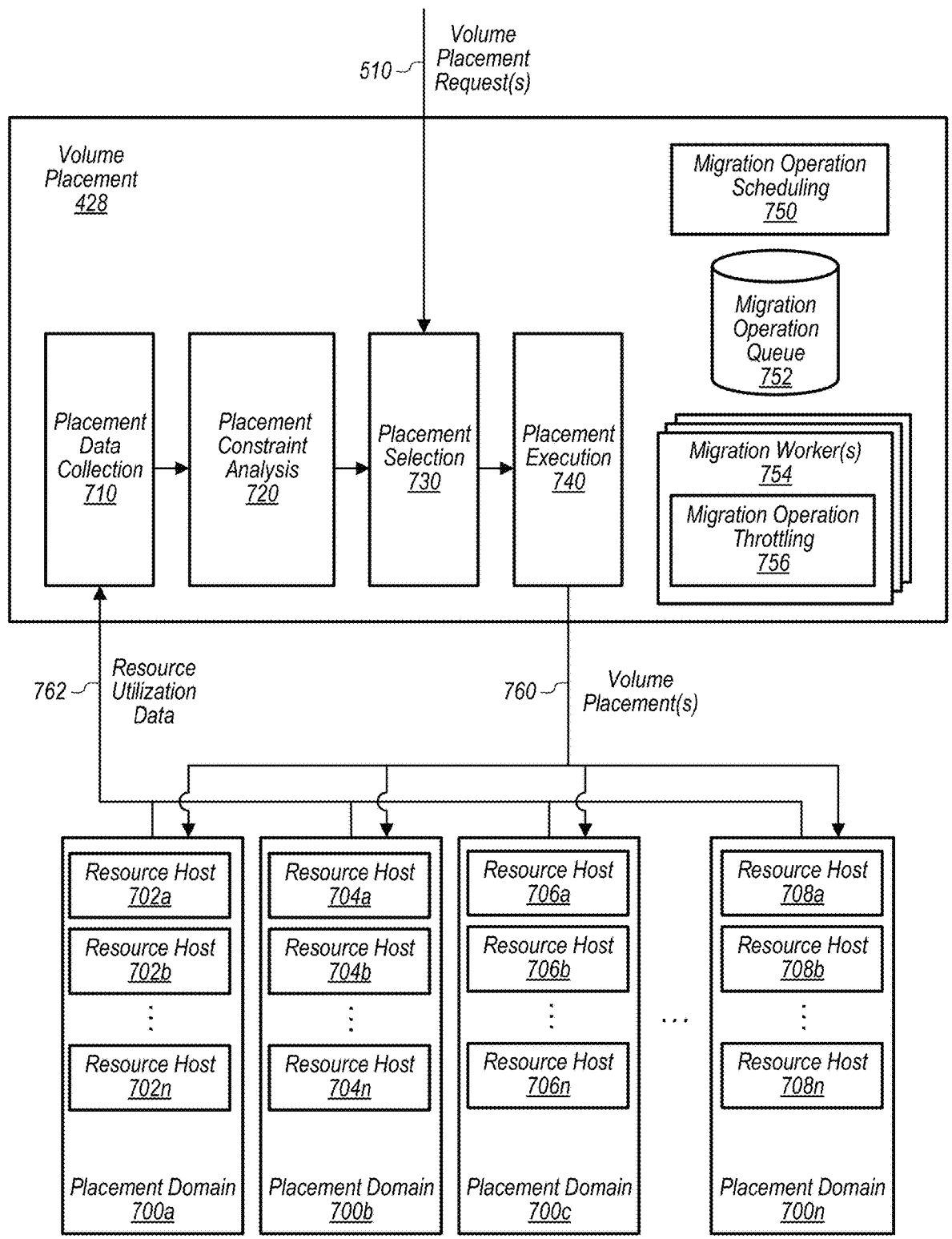
FIG. 7A is a block diagram logically illustrating a volume placement component that implements local placement, according to some embodiments.

FIG. 7A is a block diagram logically illustrating a volume placement component that implements local placement, according to some embodiments.

As noted above, multiple storage resource hosts, such as resource hosts 702, 704, 706, and 708, may be implemented in multiple placement domains, such as placement domains 700A-700N in order to provide block-based storage services. A storage resource host may be one or more computing systems or devices, such as a storage server or other computing system (e.g., computing system 1400 described below with regard to FIG. 14). Each resource host may maintain respective replicas of data volumes. Some data volumes may differ in size from other data volumes, in some embodiments. Storage resource hosts may also provide multi-tenant storage. For example, in some embodiments, resource host 706a may maintain a data volume for one account of block-based storage service 420 (as illustrated in FIG. 4), while another data volume maintained at resource host 706a may be maintained for a different account. Storage resource hosts may persist their respective data volumes in one or more block-based storage devices (e.g., hard disk drives, solid state drives, etc.) that may be directly attached to a computing system or device implementing the respective resource host. Storage resource hosts may implement different persistent storage devices. For example, some storage resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 420 may manage and maintain data volumes in a variety of different ways. Different durability schemes may be implemented for some data volumes among two or more resource hosts maintaining a same replica of a data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, resource host 702a may serve as a master resource host. A master resource host may, in various embodiments, receive and process requests (e.g., I/O requests) from clients of the data volume. Thus, resource host 702a may then coordinate replication of I/O requests, such as write requests, or any other changes or modifications to the data volume to one or more other resource hosts serving as slave resource hosts. For instance, resource host 708b may maintain a replica of the data volume maintained at resource host 702a. Thus, when a write request is received for the data volume at resource host 702a, resource host 702a may forward the write request to resource host 708b and wait until resource host 708b acknowledges the write request as complete before completing the write request at resource host 702a. Master resource hosts may direct other operations for data volumes, like snapshot operations or other I/O operations (e.g., serving a read request). In various embodiments, infrastructure diversity constraints may be implemented as requirements for master and slave(s) of a data volume, such as a requirement for server rack diversity between a resource host that implements a master and resource hosts that implement slave(s).

Please note, that in some embodiments, the role of master and slave resource hosts may be assigned per data volume. For example, for a data volume maintained at resource host 702b, resource host 702b may serve as a master resource host. While for another data volume maintained at resource host 702b, resource host 702b may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Block-based storage service control plane 422 may implement volume placement 428, in various embodiments. Volume placement 428 may be implemented at one or more computing nodes, systems, or devices (e.g., system 1400 in FIG. 14). In at least some embodiments, volume placement 428 may implement data placement collection 710 to collect information, metrics, metadata, or any other information for performing volume placement. For instance, as illustrated in FIG. 7A, resource utilization data 762 for the resource hosts in placement domains 700A-700N may be received. Placement data collection 710 may periodically (or aperiodically) poll, sweep, request, or otherwise obtain updated resource utilization data 762 from resource hosts.

Volume placement 428 may, in various embodiments, implement placement constraint analysis 720 to evaluate utilization data for the resource hosts and compare the utilization data to one or more placement constraints, such as discussed with regard to FIGS. 1A-1D above and FIG. 8A-8B, below. Placement selection 730 may be implemented to make selections based on the results of the placement constraint analysis. Placement decisions may then be made and placement execution 740 may be implemented to direct volume placement(s) 760 at resource hosts.

Placement constraint analysis 720 may consider migrating a currently placed resource to other resource hosts in another placement domain in order to free up space at resource hosts of a particular placement domain for example in response to a "jam" placement.

In some embodiments, volume placement 428 may dynamically or proactively migrate currently placed resources (e.g., data volumes or replicas) from one resource host to another resource host so that one or more placement constraints are satisfied, for example in response to a "jam" placement that causes one or more placement constraints to be temporarily violated. Migration operation scheduling 750 may determine which placements are to be performed to cause a placement domain to comply with one or more temporarily violated placement constraints. Migration operation scheduling 750 may place a migration operation for one or more resources in migration operation queue 752. In some embodiments, migration operation scheduling 750 may assign a priority to migration operations, so that more beneficial migration operations are performed sooner.

The performance of migration operations to migrate resources from one resource host to another may be asynchronous. To coordinate the scheduling and/or performing of different migration operations, a scheduling structure or other data set may be maintained. In some embodiments, a queue of migration operations, such as migration operations queue 752 may be implemented. Migration operations queue 752 may be maintained in persistent storage, such as distributed or centralized data store. In at least some embodiments, a database system or other storage system that provides transaction controls may be utilized to maintain migration operation queue. For example, migration operation queue 752 may be maintained as a database table in another network-based service, such as a NoSQL data store implemented as part of other storage service 410. Migration operation scheduling 750 may update migration operation queue 752 periodically Various metadata and information for a migration operation may be maintained, such as a volume identifier, location of a destination host, state, time of last update, and/or priority value. Migration operation scheduling 750 may also remove migration operations from queue 752. Those migration operations that have not yet been performed may have updated priorities stored in the queue (e.g., raising or lowing the priority value). Time of last update may indicate when an update to the migration operation in the queue was last made. Priority values may be assigned to migration operations in order to schedule the migration operations opportunistically in queue 752. In at least some embodiments, migration operation queue 752 may be implemented as a priority queue, and thus the highest priority migration operation may be selected for performance.

Migration worker(s) 754 may be implemented to perform migration operations. In some embodiments, migration operation throttling 756 may be implemented to control the number of ongoing migration operations. Placement data collection 710 may track, maintain, or monitor current migration operations that are ongoing at resource host(s) 702-708, along with other data, such as network utilization, resource host utilization, or any other operational metrics. In some embodiments, background operations, such as migration, may be throttled for a "jammed" placement domain, such as a "jammed" network spine, such that more capacity is available for foreground operations. In some embodiments, background operations may only be performed once foreground operations are completed to a "jammed" placement domain, such as a "jammed" network spine.

Figure 7B:
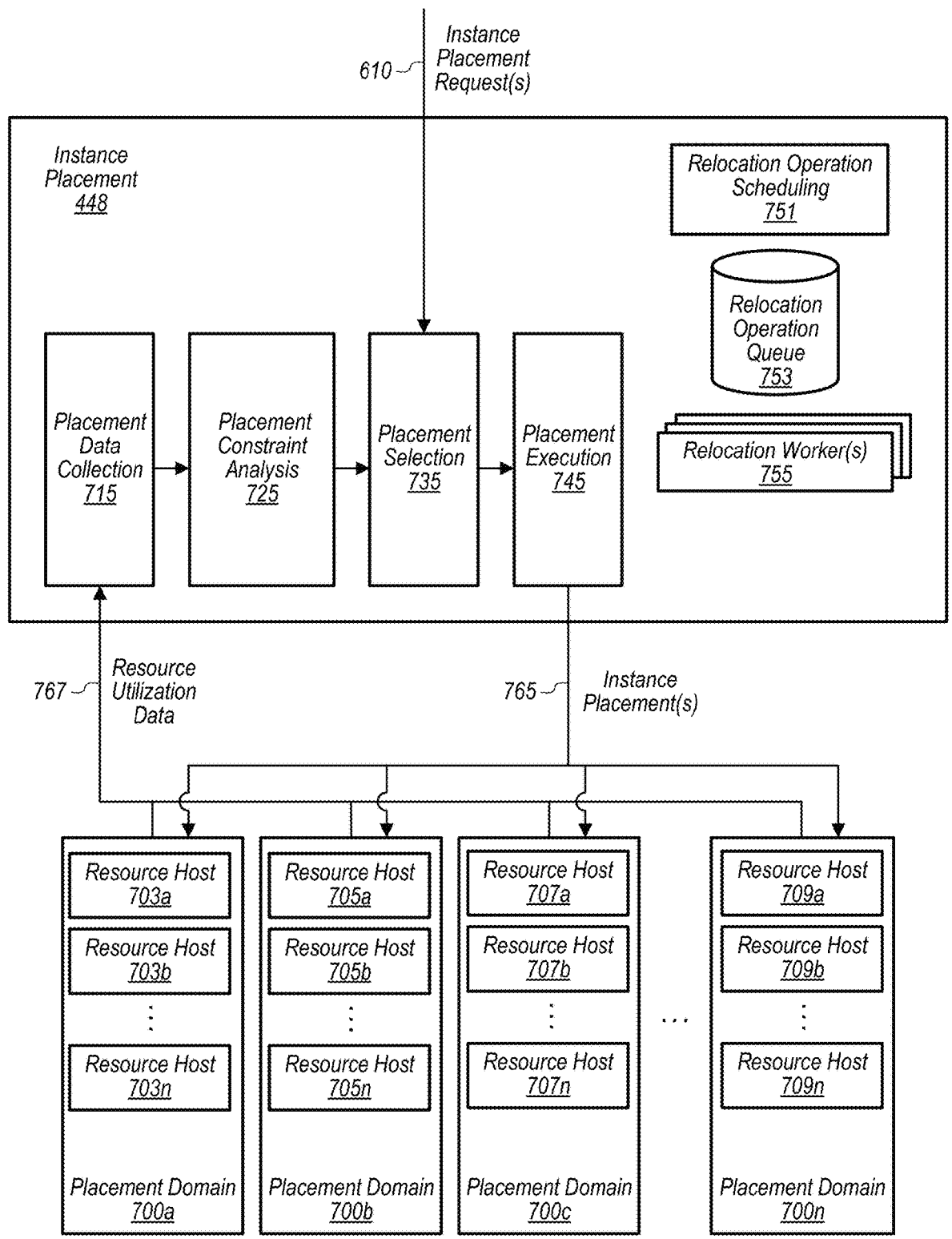
FIG. 7B is a block diagram logically illustrating an instance placement component that implements local placement, according to some embodiments.

FIG. 7B is a block diagram logically illustrating an instance placement component that implements local placement, according to some embodiments.

As noted above, multiple compute resource hosts, such as resource hosts 703, 705, 707, and 709, may be implemented in multiple placement domains, such as placement domains 700A-700N in order to provide virtual compute services. A compute resource host may be one or more computing systems or devices, such as a compute server or other computing system (e.g., computing system 1400 described below with regard to FIG. 14). Note that FIGS. 7A and 7B include storage resource hosts 702, 704, 706, and 708 and compute resource hosts 703, 705, 707, and 709 in common placement domains 700A-700N.

Compute service control plane 442 may implement instance placement 448, in various embodiments. Instance placement 448 may be implemented at one or more computing nodes, systems, or devices (e.g., system 1400 in FIG. 14). In at least some embodiments, instance placement 448 may implement data placement collection 715 to collect information, metrics, metadata, or any other information for performing compute instance placement. For instance, as illustrated in FIG. 7B, resource utilization data 767 for the resource hosts in network placement domains 700A-700N may be received. Placement data collection 715 may periodically (or aperiodically) poll, sweep, request, or otherwise obtain updated resource utilization data 767 from resource hosts.

Instance placement 448 may, in various embodiments, implement placement constraint analysis 725 to evaluate utilization data for the resource hosts and compare the utilization data to one or more placement constraints, such as discussed with regard to FIGS. 1A-1D above and FIG. 8A-8B, below. Placement selection 735 may be implemented to make selections based on the results of the placement constraint analysis. Placement decisions may then be made and placement execution 745 may be implemented to direct compute instance placement(s) 765 at resource hosts.

Placement constraint analysis 725 may consider relocating a currently placed compute resource instance to other resource hosts in another network placement domain in order to free up space at resource hosts of a particular placement domain for example in response to a "jam" placement. In some embodiments, a distributed system may perform volume migration as described in FIG. 7A or compute instance relocation as described in FIG. 7B. In some embodiments, a distributed system may perform both volume migration and compute instance relocation.

In some embodiments, compute instance placement 448 may dynamically or proactively relocate currently placed resources (e.g., compute instances) from one resource host to another resource host so that one or more placement constraints are satisfied, for example in response to a "jam" placement that causes one or more placement constraints to be temporarily violated. Relocation operation scheduling 751 may determine which placements are to be performed to cause a placement domain to comply with one or more temporarily violated placement constraints. Relocation operation scheduling 751 may place a relocation operation for one or more resources in relocation operation queue 753. In some embodiments, relocation operation scheduling 751 may assign a priority to relocation operations, so that more beneficial relocation operations are performed sooner.

The performance of relocation operations to relocate compute resource instances from one resource host to another may be asynchronous. To coordinate the scheduling and/or performing of different relocation operations, a scheduling structure or other data set may be maintained. In some embodiments, a queue of relocation operations, such as relocation operations queue 753 may be implemented. Relocation operations queue 753 may be maintained in persistent storage, such as distributed or centralized data store.

Relocation worker(s) 755 may be implemented to perform relocation operations. Placement data collection 715 may track, maintain, or monitor current relocation operations that are ongoing at resource host(s) 703-709, along with other data, such as network utilization, resource host utilization, or any other operational metrics.

Figure 8A:
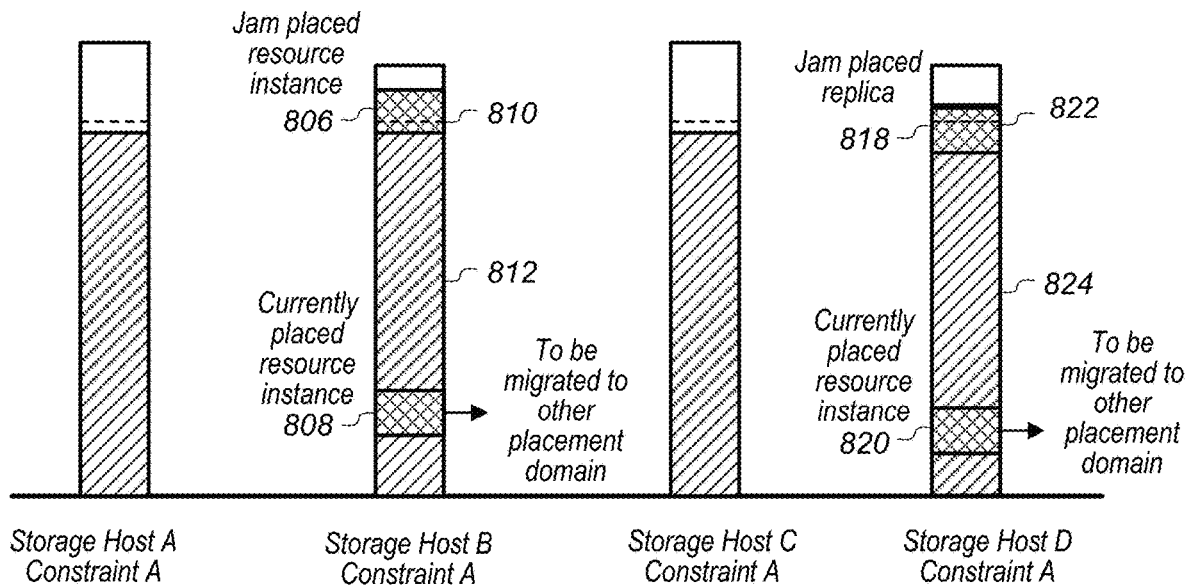
FIG. 8A illustrates a diagram indicating resource utilizations for different resource hosts and indicating different placement constraints, wherein a resource instance and its replica are being jam placed, according to some embodiments.

FIG. 8A illustrates a diagram indicating resource utilizations for different resource hosts and indicating different placement constraints, wherein a resource instance and its replica are being jam placed, according to some embodiments.

In some embodiments, a "jam" placement may also include a "jam" placement for a replica of a resource instance being placed. For example, a high performance volume may include a durability guarantee that the volume will be replicated and may also include a placement domain local placement constraint. In such embodiments, a "jam" placed replica, such as "jam" placed replica 806, may be placed on a storage host, such as storage host B, and may cause utilized capacity of storage host B to exceed placement constraint 810. Additionally, "jam" placed replica 818 may be "jam" placed on storage host D and cause currently utilized capacity 824 of storage host D to exceed placement constraint 822. In order to return respective utilized capacities of storage host B and storage host D to within placement constraints 810 and 822, a resource placement manager may cause currently placed instances 808 and 820 to be migrated to one or more other placement domains.

Figure 8B:
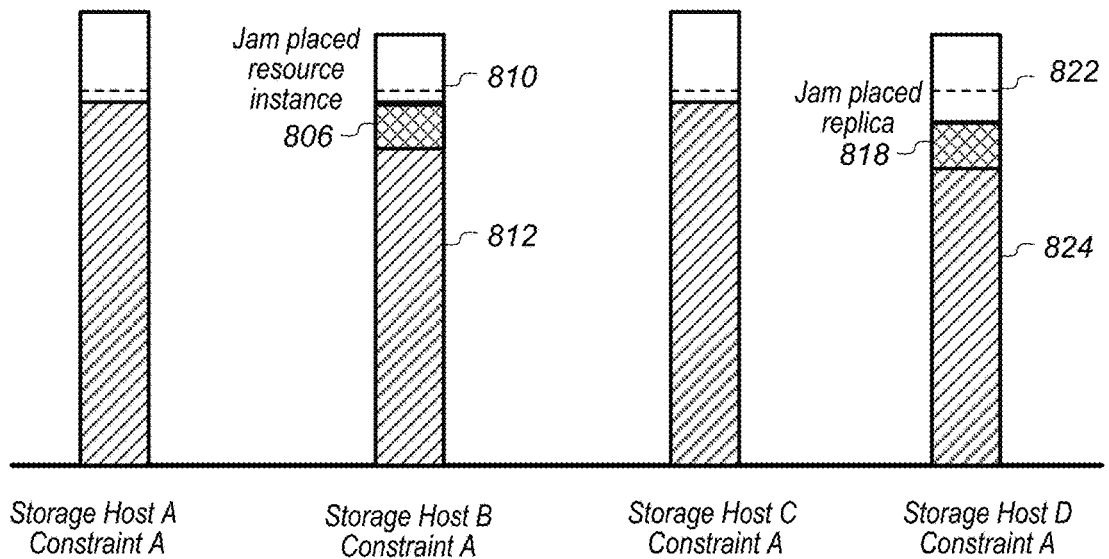
FIG. 8B illustrates a diagram indicating resource utilizations for different resource hosts and indicating different placement constraints subsequent to one or more mitigating actions being performed after jam placement of a resource instance and its replica, according to some embodiments.

FIG. 8B illustrates a diagram indicating resource utilizations for different resource hosts and indicating different placement constraints subsequent to one or more mitigating actions being performed after jam placement of a resource instance and its replica, according to some embodiments.

As can be seen in FIG. 8B, subsequent to migration of resource instances 808 and 820, the respective currently utilized capacities 812 and 824 of storage hosts B and D are returned to within placement constraints 810 and 822.

In some embodiments, a distributed system may support any number of replicas for a resource instance, such as two replicas, three replicas, etc. In some embodiments any number of replicas for a resource instance may be "jam" placed.

In some embodiments, a replica may not be "jam" placed and instead a primary volume may be temporarily placed in a particular placement domain without a replica, and a replica may subsequently be placed after one or more currently placed resources instances are migrated to another placement domain. Also, in some embodiments, a replica for one or more lower priority resource instance may temporarily be released to allow sufficient capacity to "jam" place a resource instance. In such situations, subsequent to migrating one or more volumes to another placement domain, the replica for the one or more lower priority resource instances may be re-instated.

Figure 9:
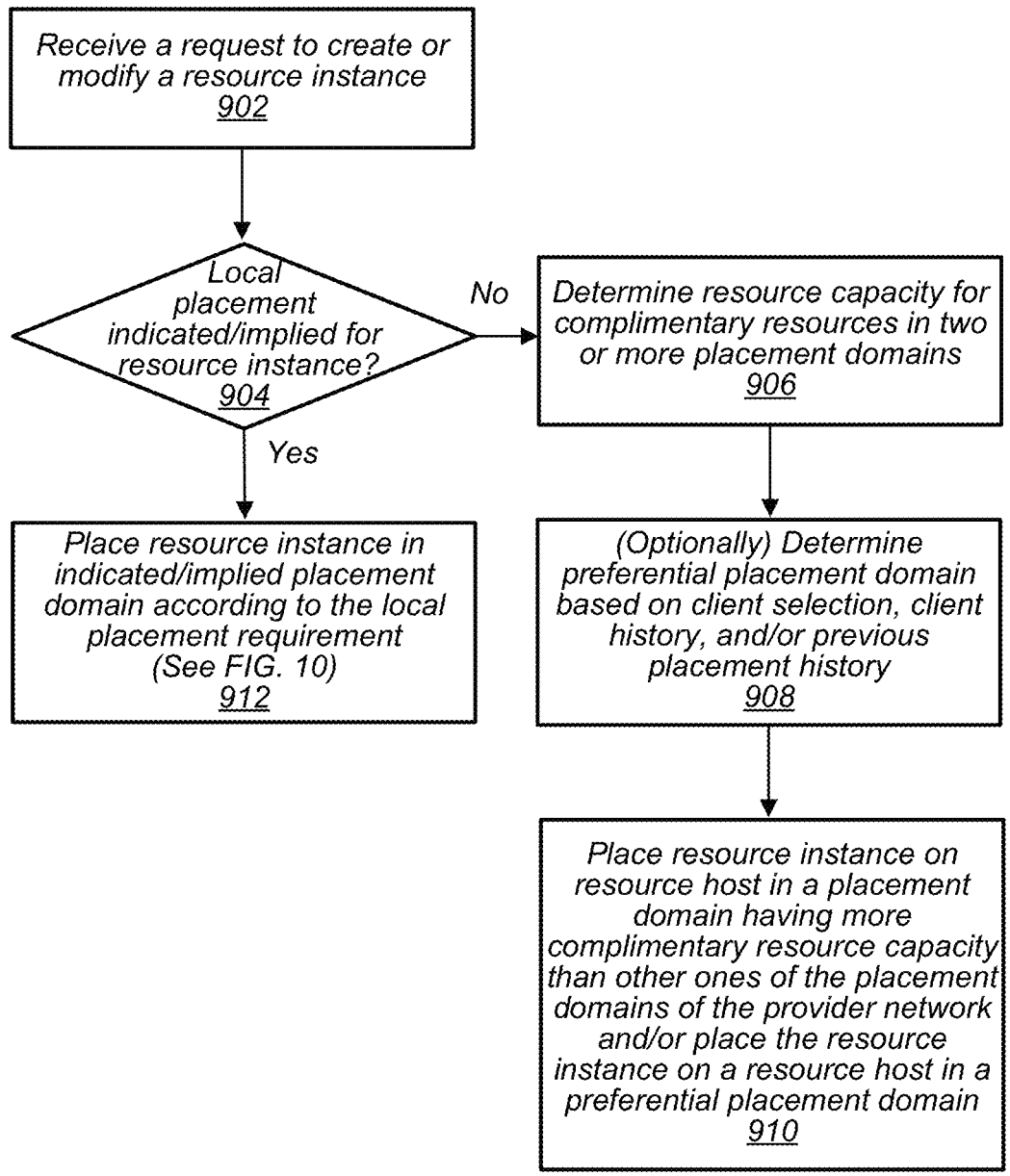
FIG. 9 is a high-level flowchart illustrating various methods and techniques for creating or modifying a resource instance, according to some embodiments.

FIG. 9 is a high-level flowchart illustrating various methods and techniques for creating or modifying a resource instance, according to some embodiments.

At 902, a request to create or modify a resource instance is received. For example the request may be received via a service interface, such as service interface 460 of provider network 400 illustrated in FIG. 4.

At 902 it is determined whether the request to create or modify the resource instance indicates or implies placement domain local placement for the resource instance. For example a create and attach volume request may indicate a compute instance to which the volume is to be attached. Also, a create and attach compute instance request may indicate a volume to which the compute instance is to be attached. Also, a request may indicate a placement group for a particular resource instance. In some embodiments, a modification request may indicate that an already placed compute instance or volume is to be modified to be attached to another already placed compute instance or volume. In such embodiments, a resource placement manager may relocate one of the compute instance or the volume to be implemented on a resource host in a same placement domain as another one of the compute instance or the volume.

If placement domain local placement is not indicated, at 906, a resource placement manager may determine resource capacity for complimentary resources for the resource being placed. For example, if the resource instance to be placed is a storage resource instance that implements a volume, the resource placement manager may place the volume in a placement domain with more available compute resource instance capacity. This may allow a subsequently requested compute instance to be attached to the volume in the same placement domain without exceeding one or more placement constraints for compute resource instances in the particular placement domain.

At 908, the resource placement manager may (optionally) perform one or more heuristic analysis to determine a preferred placement domain for placement of the resource instance. For example, the resource manager may take into account a client indicated preference for a particular availability zone, data center, or network spine. The resource manager may also take into account a client placement history and or previous placement histories for other clients that are similar to the client. In this way, a resource placement manager may anticipate future placements the client may request and place the resource instance in a placement domain than has sufficient capacity to facilitate the future placements.

At 910, the resource placement manager, may place the requested resource instance on a resource host in a placement domain in accordance with the determined capacity from 906 and in accordance with any determined placement domain preferences determined at 908.

Figure 10:
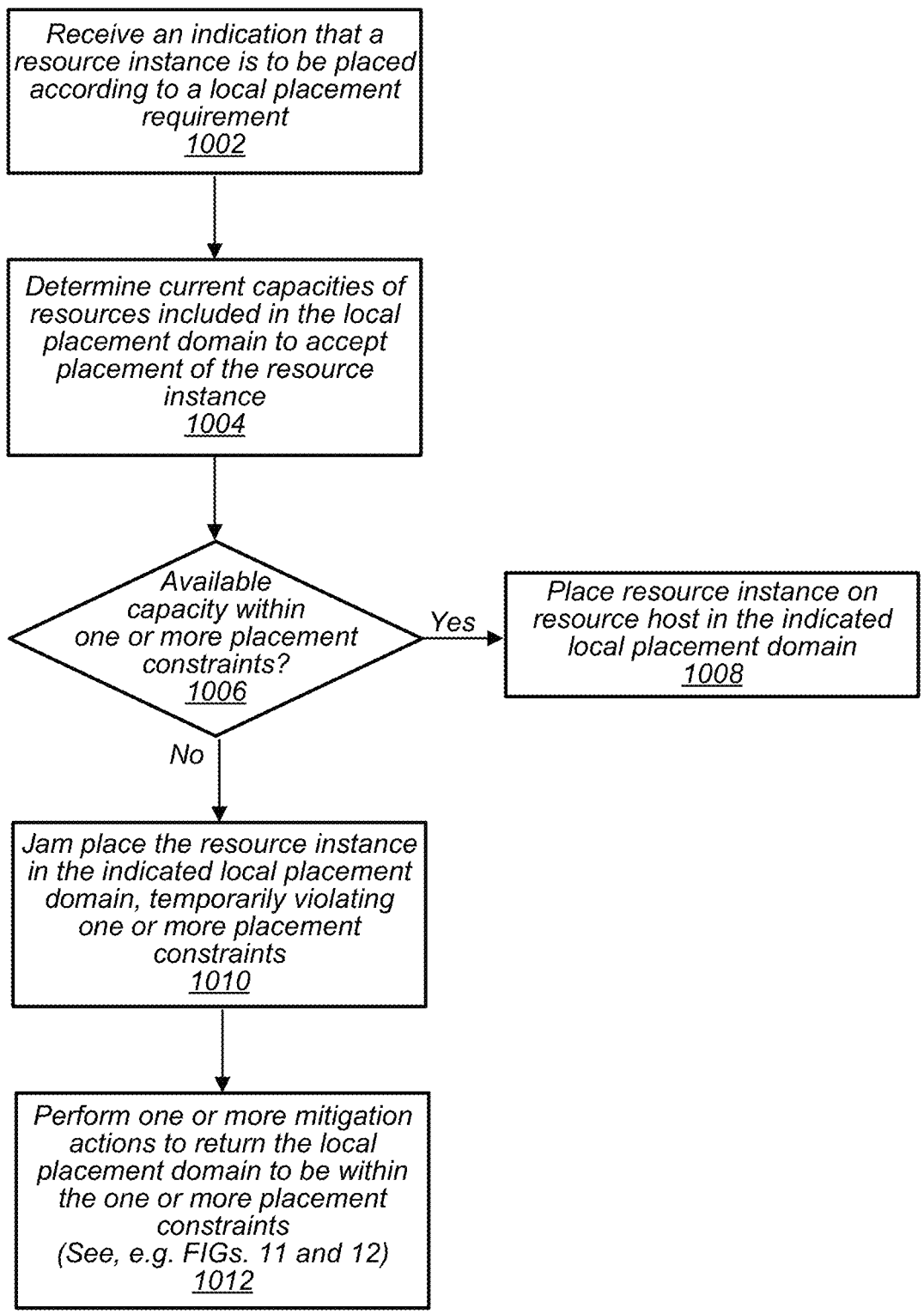
FIG. 10 is a high-level flowchart illustrating various methods and techniques for performing a local placement of a resource instance, according to some embodiments.

FIG. 10 is a high-level flowchart illustrating various methods and techniques for performing a spine local placement of a resource instance, according to some embodiments.

At 1002, an indication is received that a resource instance is to be placed in accordance with a placement domain local placement requirement. For example, the indication may be included in the request received at 902.

At 1004, a resource placement manager determines current capacities of resource hosts included in a placement domain targeted by the spine local placement requirement. At 1006, it is determined if there is sufficient capacity on the resource hosts of the targeted placement domain to place the resource instance without violating one or more placement constraints. If there is sufficient capacity, the resource instance is placed at 1008.

If there is insufficient capacity within the one or more placement constraints, the resource instance is "jam" placed at 1010. The "jam" placement of the resource instance may cause one or more of the placement constraints to be temporarily violated.

At 1012, one or more mitigation actions are performed to return the utilized capacity of the resource hosts of the "jammed" placement domain to within the one or more placement constraints. For example, one or more volumes may be migrated to another placement domain as described in FIG. 11 or one or more compute instances may be relocated to another placement domain as described in FIG. 12.

Figure 11:
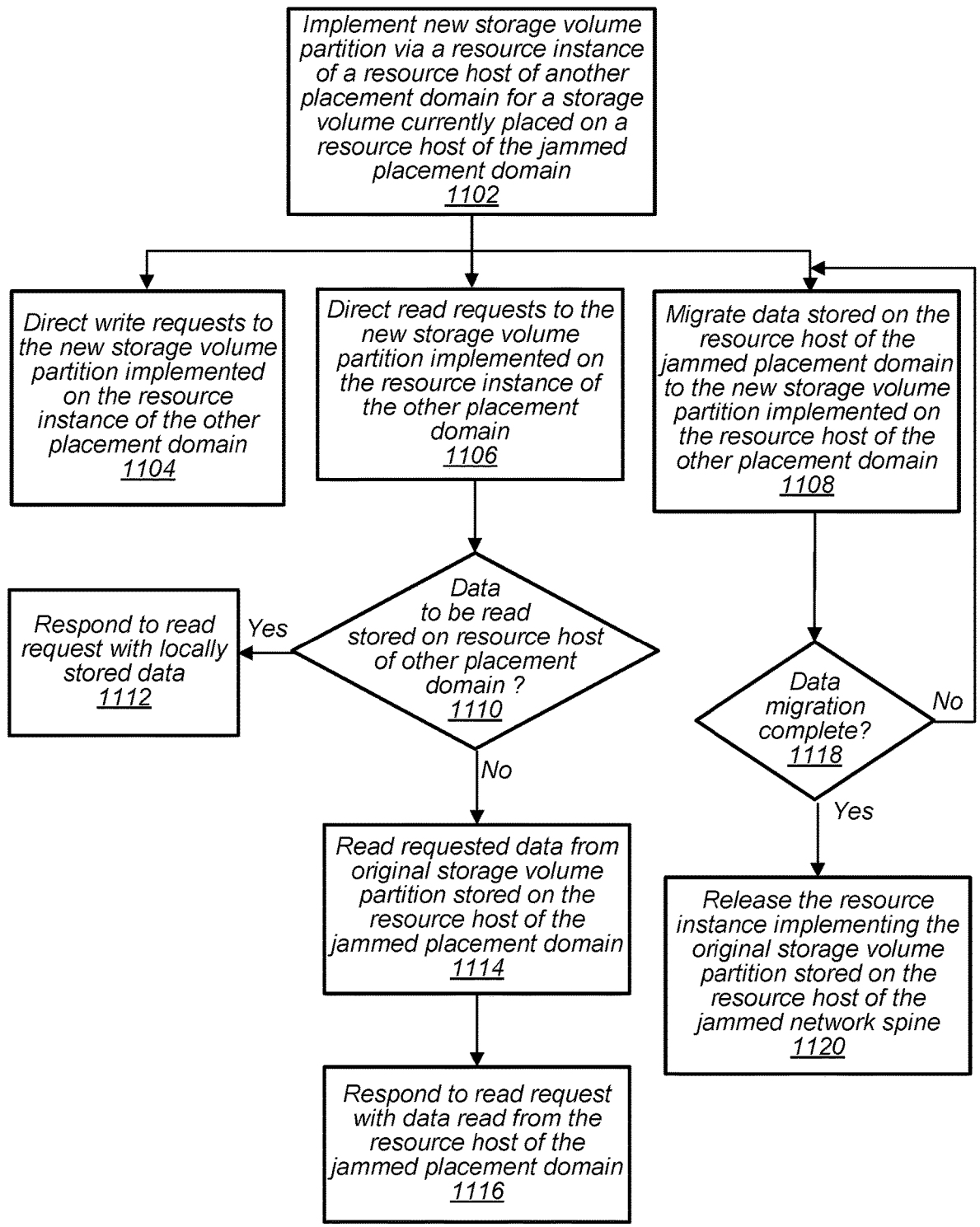
FIG. 11 is a high-level flowchart illustrating various methods and techniques for relocating a storage volume in connection with performing a local placement, according to some embodiments.

FIG. 11 is a high-level flowchart illustrating various methods and techniques for relocating a storage volume in connection with performing a local placement, according to some embodiments.

At 1102, a resource placement manager and/or a migration worker associated with a resource placement manager implements a new storage volume partition for a storage volume being migrated from a "jammed" placement domain to another placement domain with sufficient capacity to accept placement of the storage volume being migrated from the "jammed" placement domain. At 1104, a control plane of a block-based storage service begins to direct write requests for the volume being migrated to the newly implemented storage volume partition implemented on the resource host of the other placement domain. In some embodiments, directing all newly received write requests to the newly implemented volume partition may halt further growth in data size of the volume implemented on the resource host of the currently "jammed" placement domain.

At 1106, read requests are also directed to the newly implemented storage volume partition implemented on the resource host of the other placement domain. For a particular read request, it is determined, at 1110, whether data targeted by the read request is stored on the newly implemented storage volume partition. If the data is stored on the resource host of the other placement domain that implements the new storage volume partition, then at 1112 a response to the read request is generated based on locally read data stored on the resource host of the other placement domain. However, at 1114, if the data targeted by the read request is not stored on the resource host of the other placement domain, the data is read from the resource host of the currently "jammed" placement domain that originally implemented the storage volume. At 1116, a response to the read request is generated based on data read from the resource host of the "jammed" placement domain.

Also, at 1108, while write requests are being directed to the newly implemented partition and read requests are being directed to the newly implemented partition (if received), data stored on the resource host of the "jammed" placement domain for the storage volume is being migrated to the resource host of the other placement domain that implements the new storage volume partition. At 1118, it is determined whether the data migration is complete. If not, the data migration continues. However, if the data migration is complete, at 1120, the resource instance placed on the resource host of the "jammed" placement domain that implemented the original volume is released, thus reducing an amount of utilized capacity of resource hosts of the "jammed" placement domain.

Figure 12:
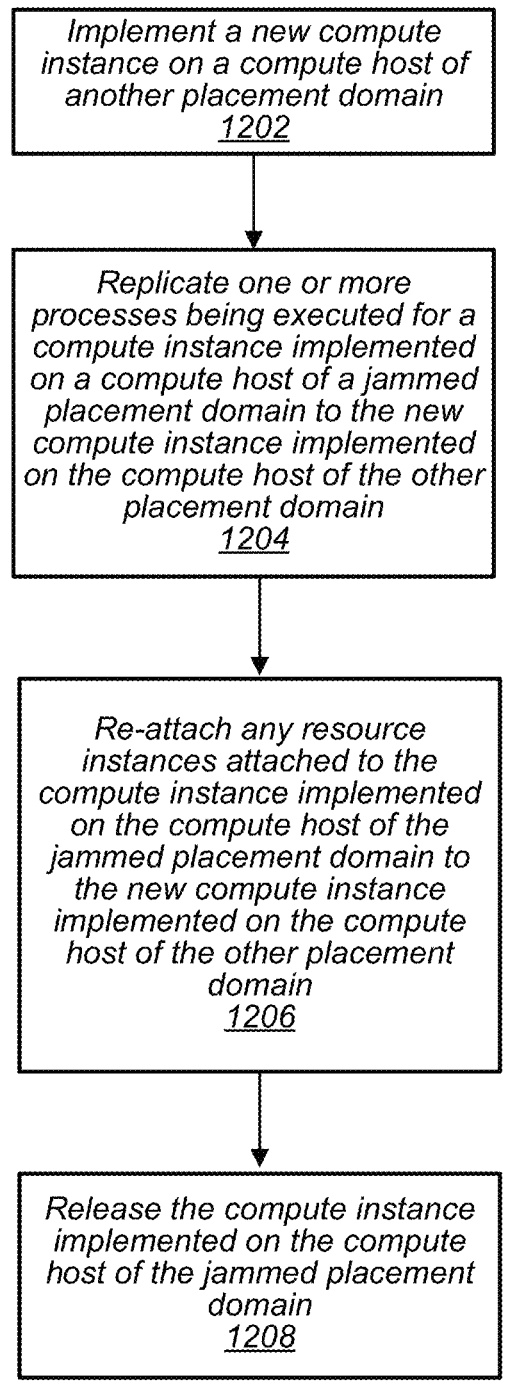
FIG. 12 is a high-level flowchart illustrating various methods and techniques for relocating a compute instance in connection with performing a local placement, according to some embodiments.

FIG. 12 is a high-level flowchart illustrating various methods and techniques for relocating a compute instance in connection with performing a local placement, according to some embodiments.

At 1202, a resource placement manager and/or a relocation worker associated with a resource placement manager implements a new compute instance on a compute host of another placement domain.

At 1204, one or more processes being executed for a compute instance implemented on a compute host of a "jammed" placement domain are replicated to the newly implemented compute instance implemented on the compute host of the other placement domain. Also, at 1206, any resource instance attached to the compute instance implemented on the compute host of the "jammed" placement domain are re-attached to the newly implemented compute instance implemented on the resource instance of the other placement domain.

At 1208, the compute instance implemented on the resource host of the "jammed" placement domain is released, thus reducing a currently utilized resource capacity for the "jammed" placement domain.

Figure 13A:
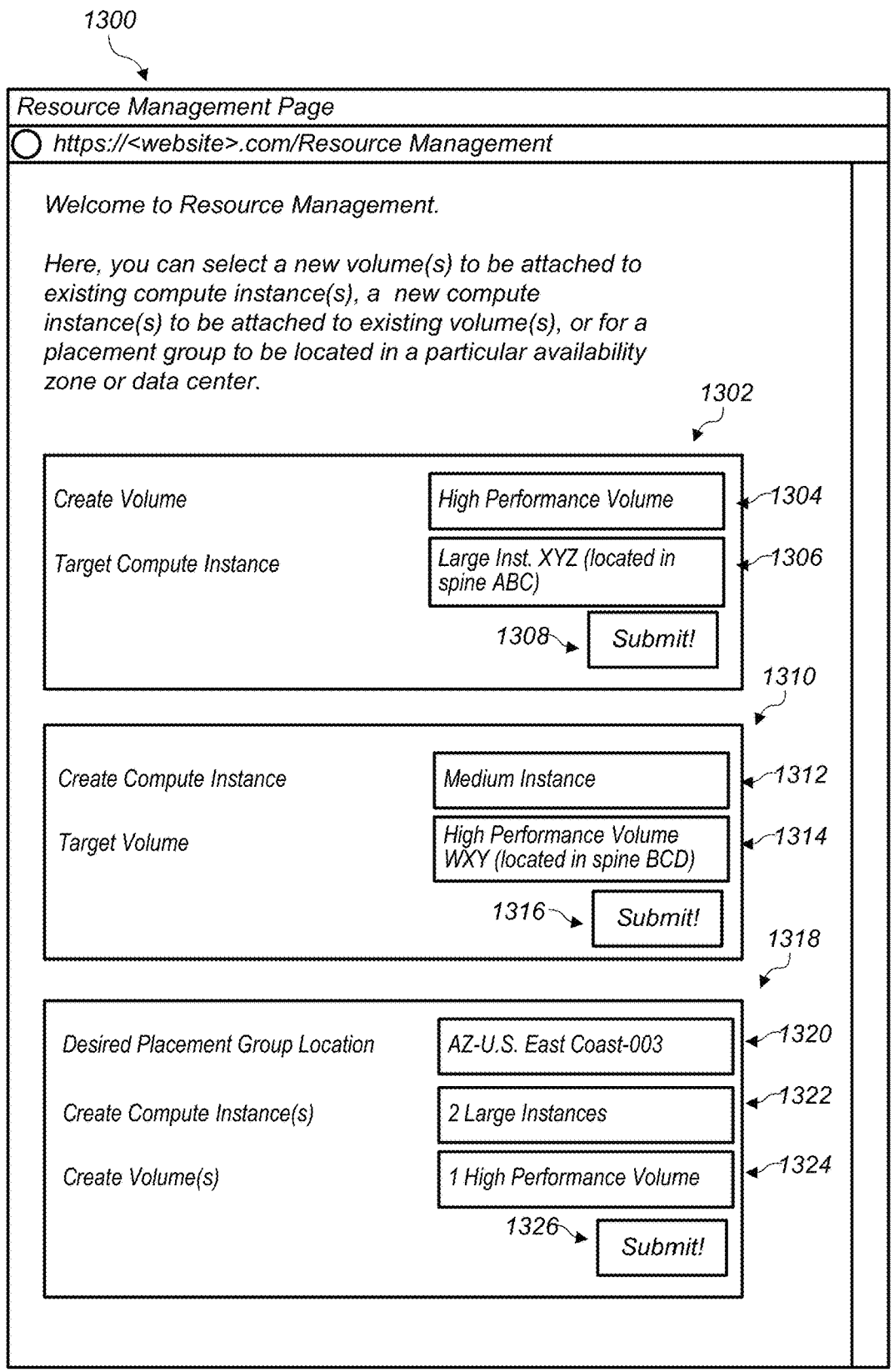
FIGS. 13A-13B are example graphical user interfaces for indicating placement for resource instances, according to some embodiments.
Figure 13B:
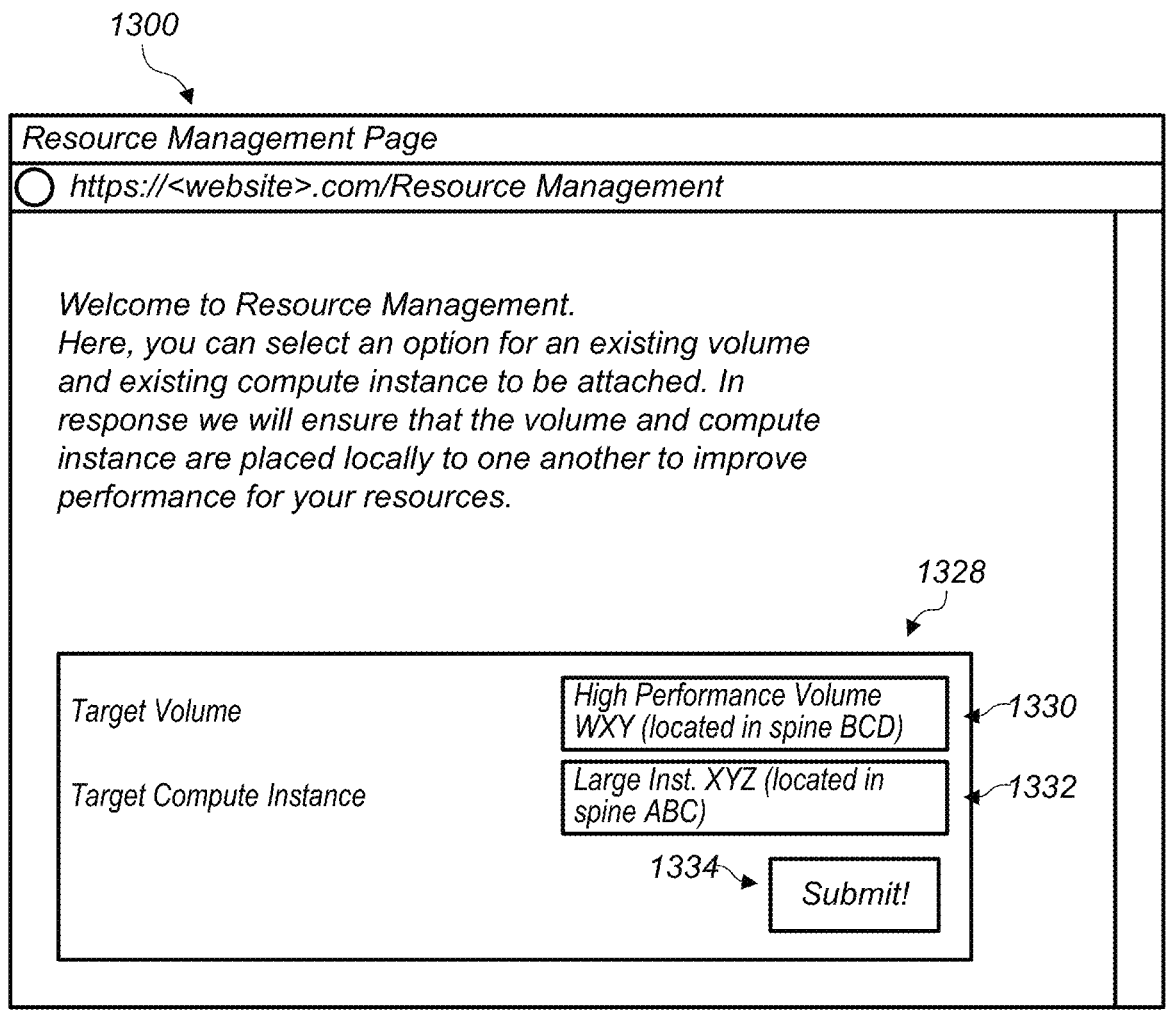

FIGS. 13A-13B are example graphical user interfaces for indicating local placement for resource instances, according to some embodiments.

User interface 1300 includes create volume field 1302, create compute instance field 1310, and placement group field 1318. In some embodiments, a client may select a type and/or quantity of volumes desired via input 1304 of create volume field 1302. A client may also specify a target compute instance to be attached to the requested volume that is to be created via input 1306. Additionally, the client may cause the requested volume to be created and attached to the specified compute instance by selecting submit button 1308.

In some embodiments, a client may select a type and/or quantity of compute instances desired via input 1312 of create compute instance field 1310. A client may also specify a target volume to be attached to the requested compute instance that is to be created via input 1314. Additionally, the client may cause the requested compute instance to be implemented and attached to the specified volume by selecting submit button 1316.

In some embodiments, a client may request a placement group be created at a particular location, such as an availability zone, data center, or network spine. For example a client may indicate a location for requested placement group via input 1320 of placement group field 1318. Additionally the client may specify a type or quantity of compute instances to be included in the placement group via input 1322 and may also select a type or quantity of volumes to be included in the placement group via input 1324. In some embodiments, all compute instances and volumes included in a placement group may be placed in the same network spine. Thus, a client may not need to specify a particular network spine, and a spine local placement requirement for the compute instances and volumes included in the placement group may be inferred based on the compute instances and volumes being included in the same placement group.

In some embodiments, a user interface, such as user interface 1300, may also include an attachment field 1328. An attachment field 1328 may include an input 1330 wherein a client can specify an already placed volume and an input 1332 wherein a client can specify an already placed compute instance. In response to submit button 1334 being selected, a resource placement manager and/or migration worker may relocate or migrate either the indicated volume, the indicated compute instance, or both such that the indicated compute instance and the indicated volume are placed in the same placement domain.

Figure 14:
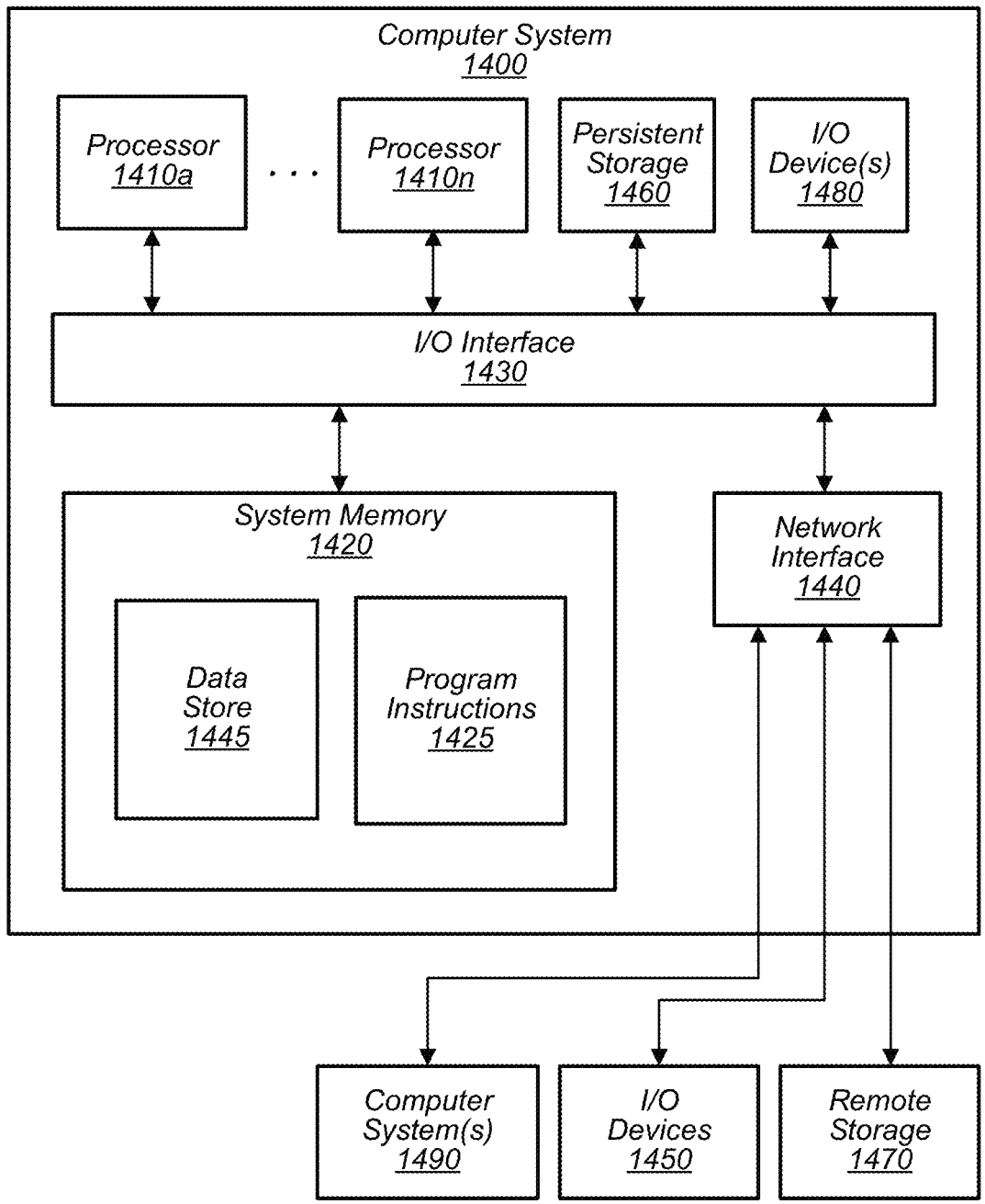
FIG. 14 is a block diagram illustrating an example computing system, according to some embodiments.

FIG. 14 is a block diagram illustrating an example computing system, according to some embodiments. For example, computer system 1400 may be configured to implement storage and/or compute nodes of a compute cluster, a data stores, and/or a client, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.).

In the illustrated embodiment, computer system 1400 also includes one or more persistent storage devices 1460 and/or one or more I/O devices 1480. In various embodiments, persistent storage devices 1460 may correspond to disk drives, tape drives, solid state memory, other mass storage devices, block-based storage devices, or any other persistent storage device. Computer system 1400 (or a distributed application or operating system operating thereon) may store instructions and/or data in persistent storage devices 1460, as desired, and may retrieve the stored instruction and/or data as needed. For example, in some embodiments, computer system 1400 may host a storage system server node, and persistent storage 1460 may include the SSDs attached to that server node.

Computer system 1400 includes one or more system memories 1420 that are configured to store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a resource host, in different embodiments. In some embodiments, program instructions 1425 may implement multiple separate clients, nodes, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1445, which may be configured as described herein. In general, system memory 1420 (e.g., data store 1445 within system memory 1420), persistent storage 1460, and/or remote storage 1470 may store data blocks, replicas of data blocks, metadata associated with data blocks and/or their state, configuration information, and/or any other information usable in implementing the methods and techniques described herein.

In one embodiment, I/O interface 1430 may be configured to coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems 1490, for example. In addition, network interface 1440 may be configured to allow communication between computer system 1400 and various I/O devices 1450 and/or remote storage 1470. Input/output devices 1450 may, in some embodiments, include one or more display terminals, keyboards, keypads, touchpads, scanning devices, voice or optical recognition devices, or any other devices suitable for entering or retrieving data by one or more computer systems 1400. Multiple input/output devices 1450 may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A provider network, comprising:
a plurality of storage hosts configured to provide storage resources to clients of the provider network;
a plurality of compute hosts configured to provide compute resources to clients of the provider network;
a plurality of network routers that connect respective sets of the storage hosts and respective sets of the compute hosts to form respective network spines of the provider network; and
a resource placement manager configured to:
receive an indication that a storage volume is to be placed in accordance with a spine local placement requirement;
determine one or more current capacities of storage hosts associated with a particular network spine to accept placement of the storage volume relative to one or more placement constraints; and
in response to determining the storage hosts associated with the particular network spine lack capacity to accept placement of the storage volume relative to at least one of the one or more placement constraints:
place the storage volume on one of the storage hosts associated with the particular network spine, wherein the placement temporarily violates the at least one placement constraint; and
migrate one or more other volume partitions currently stored on one or more of the storage hosts associated with the particular network spine to one or more storage hosts associated with another one of the network spines, wherein, subsequent to migrating the one or more volumes, the capacity of the storage hosts associated with the particular network spine satisfy the at least one placement constraint.

2. The provider network of claim 1, wherein, in response to the indication that the storage volume is to be placed in accordance with the spine local placement requirement, the resource placement manager is further configured to:
place a replica of the storage volume on one of the storage hosts associated with the particular network spine, wherein the placement of the replica of the storage volume violates the at least one placement constraint or another one of the one or more placement constraints, wherein subsequent to migrating the one or more volume partitions, the capacity of the storage hosts associated with the particular network spine satisfy the at least one placement constraint and the other placement constraint.

3. The provider network of claim 2, wherein at least one of the placement constraints is that a replica of the storage volume and the storage volume are to be placed on storage hosts located in different racks in the particular network spine.

4. The provider network of claim 1, further comprising:
a plurality of data center buildings,
wherein each data center building comprises at least one of the sets of storage hosts, at least one of the sets of compute hosts, and at least one of the routers, and
wherein respective ones of the network spines are associated with respective ones of the data center buildings.

5. The provider network of claim 1, wherein at least one of the placement constraints is that a storage volume is to be placed on a storage host having one or more performance capabilities that correspond with one or more performance capabilities assigned to the storage volume,
wherein the violation of the at least one placement constraint comprises placing the storage volume on a storage host having one or more higher performance capabilities than the one or more performance capabilities assigned to the storage volume,
wherein the resource placement manager is further configured to, subsequent to migrating the one or more other volume partitions to the one or more storage hosts associated with the other one of the network spines:
migrate the storage volume from the storage host having the one or more higher performance capabilities to another storage host associated with the particular network spine having performance capabilities that correspond with performance capabilities assigned to the storage volume.

6. A method, comprising:
receiving an indication that a resource instance is to be placed in a provider network in accordance with a local placement requirement for placement in a particular placement domain of the provider network, wherein respective networking devices of the provider network connect respective sets of storage hosts and respective sets of compute hosts to form respective placement domains of the provider network;
determining one or more capacities of the storage hosts or compute hosts associated with the particular placement domain to accept placement of the resource instance relative to one or more placement constraints; and
in response to determining the storage hosts or the compute hosts associated with the particular placement domain lack capacity to accept placement of the resource instance relative to at least one of the one or more placement constraints:
placing the resource instance on one of the storage hosts or one of the compute hosts associated with the particular placement domain, wherein the placement violates the at least one placement constraint; and performing one or more mitigating actions, wherein subsequent to performing the mitigating actions, the storage hosts and compute hosts associated with the particular placement domain satisfy the at least one placement constraint.

7. The method of claim 6, wherein the at least one placement constraint comprises:
a durability constraint, wherein placing the resource instance causes a durability level for the resource instance or other resource instances placed on other ones of the storage hosts associated with the particular placement domain to fall below the durability constraint in violation of the at least one placement constraint.

8. The method of claim 7, wherein the durability constraint requires a replica of each storage volume stored on a storage host of the particular placement domain to be replicated onto another storage host of the particular placement domain.

9. The method of claim 6, the method further comprising:
receiving a request to provide a compute resource instance, wherein the resource instance being placed is the requested compute resource instance, wherein the request specifies a volume placed in the particular placement domain that is to be attached to the requested compute resource instance, and
wherein the local placement requirement comprises a requirement that the compute resource instance be placed in a same placement domain where a storage resource instance implementing the specified volume is placed.

10. The method of claim 6, the method further comprising:
receiving a request to provide a storage resource instance, wherein the resource instance being placed is the requested storage resource instance, and wherein the request specifies a compute resource instance placed in the particular placement domain that is to be attached to the requested storage resource instance, and
wherein the local placement requirement comprises a requirement that the storage resource instance be placed in a same placement domain where the specified compute resource instance is placed.

11. The method of claim 6, the method further comprising:
receiving a request to provide a compute resource instance, wherein the resource instance being placed is the requested compute resource instance, and wherein the request does not specify a volume that is to be attached to the requested resource instance, and
placing the compute resource instance in a placement domain of the provider network having more available storage capacity than other ones of the placement domains of the provider network.

12. The method of claim 6, wherein the at least one placement constraint comprises:
a constraint requiring an amount of physical storage space remaining available on the storage hosts associated with the particular placement domain to be at least a threshold amount of available space, wherein placing the resource instance causes the remaining available physical storage space to fall below the threshold in violation of the at least one placement constraint; or
a constraint requiring an amount of storage space allocated for use by clients of the provider network on the storage hosts associated with the particular placement domain to be less than a threshold amount of allocated storage space, and wherein placing the resource instance causes the amount of storage space allocated to the clients to be greater than the threshold amount of allocated storage space in violation of the at least one placement constraint.

13. The method of claim 6, wherein performing the one or more mitigating actions comprises:
implementing a new storage volume partition on one of the storage hosts associated with another one of the placement domains of the provider network for a storage volume currently placed in the particular placement domain;
directing write requests directed to the storage volume to the new storage volume partition implemented on the storage host associated with the other placement domain;
migrating data stored on the storage host associated with the particular placement domain to the new storage volume partition implemented on the storage host associated with the other placement domain;
receiving read requests for the storage volume at the newly implemented storage volume partition; and
reading data from the new storage volume partition implemented on the storage host associated with the other placement domain to respond to the read request for data that has been migrated to the new storage volume partition; and
reading data from the storage host associated with the particular placement domain for data yet to be migrated to the new storage volume partition implemented on the storage host associated with the other placement domain.

14. The method of claim 6, wherein the particular placement domain is:
a network spine of the provider network;
a data center of the provider network; or
an availability zone of the provider network.

15. A non-transitory computer readable medium storing program instructions, that when executed by one or more processors, cause the one or more processors to:
receive an indication that a resource instance is to be placed in a provider network accordance with a local placement requirement, wherein, for each of a plurality of placement domains of the provider network, a networking device of the provider network connects a set of storage hosts and a set of compute hosts of the provider network;
determine one or more capacities of the storage hosts or compute hosts associated with a particular placement domain to accept placement of the resource instance relative to one or more placement constraints; and
in response to determining the storage hosts or the compute hosts associated with the particular placement domain lack capacity to accept placement of the resource instance relative to at least one of the one or more placement constraints:
cause the resource instance to be placed on one of the storage hosts or one of the compute hosts associated with the particular placement domain, wherein the placement violates the at least one placement constraint; and
cause one or more other resource instances currently placed on one or more of the storage hosts or one or more of the compute hosts associated with the particular placement domain to be relocated to one or more storage hosts or one or more compute hosts associated with another one of the placement domains of the provider network, wherein subsequent to relocating the one or more other resource instances, the available capacity of the storage hosts and compute hosts associated with the particular placement domain satisfy the at least one placement constraint.

16. The non-transitory computer readable medium of claim 15, wherein the program instructions when executed by the one or more processors further cause the one or more processors to:
   implement an application programming interface (API) configured to receive a request from a client of the provider network to create a storage volume and attach the created storage volume to a compute resource instance already placed on a compute host in the particular placement domain,
   wherein the resource instance to be placed in the particular placement domain in accordance with the local placement requirement is a storage resource instance that implements the requested storage volume.

17. The non-transitory computer readable medium of claim 15, wherein the program instructions when executed by the one or more processors further cause the one or more processors to:
   implement an application programming interface (API) configured to receive a request from a client of the provider network to create a compute instance and attach the created compute instance to a storage volume implemented on a storage resource instance already placed on a storage host in the particular placement domain,
   wherein the resource instance to be placed in the particular placement domain in accordance with the local placement requirement is the compute resource instance to be attached to the storage volume implemented on the storage resource instance already placed on the storage host in the particular placement domain.

18. The non-transitory computer readable medium of claim 15, wherein the program instructions when executed by the one or more processors further cause the one or more processors to:
   implement an application programming interface (API) configured to receive a request from a client of the provider network to create a placement group and to place a compute resource instance or storage resource instance in the placement group,
   wherein the resource instance to be placed in the particular placement domain in accordance with the spine placement requirement is the compute resource instance or the storage resource instance to be placed in the placement group.

19. The non-transitory computer readable medium of claim 15, wherein the request from the client specifies that the placement group is to be located within a specified availability zone or data center of the provider network.

20. The non-transitory computer readable medium of claim 15, wherein the resource instance to be placed is a compute resource instance, and wherein to cause the one or more other resource instances currently placed on the one or more storage hosts or the one or more compute hosts associated with the particular placement domain to be relocated to one or more storage hosts or one or more compute hosts associated with the other one of the placement domains of the provider network, comprises:
   replicating a process being executed, for a compute resource instance, on the compute host associated with the particular placement domain and implementing the replicated process for the compute resource instance on a compute host associated with the other one of the placement domains of the provider network; and
   releasing the compute resource instance implemented on the compute host associated with the particular placement domain such that the available capacity of the compute hosts associated with the particular placement domain satisfy the at least one placement constraint.

* * * * *